(12) United States Patent
Venkataramani et al.

(10) Patent No.: US 12,444,172 B2
(45) Date of Patent: Oct. 14, 2025

(54) VARIABLE CONFIDENCE MACHINE LEARNING

(71) Applicant: GE Precision Healthcare LLC, Wauwatosa, WI (US)

(72) Inventors: Rahul Venkataramani, Bengaluru (IN); Vikram Reddy Melapudi, Bangalore (IN)

(73) Assignee: GE Precision Healthcare LLC, Waukesha, WI (US)

( * ) Notice: Subject to any disclaimer, the term of this patent is extended or adjusted under 35 U.S.C. 154(b) by 428 days.

(21) Appl. No.: 18/059,082

(22) Filed: Nov. 28, 2022

(65) Prior Publication Data

US 2024/0177459 A1 May 30, 2024

(51) Int. Cl.
*G06V 10/774* (2022.01)
*G06T 7/00* (2017.01)
*G06V 10/82* (2022.01)

(52) U.S. Cl.
CPC .......... *G06V 10/774* (2022.01); *G06T 7/0014* (2013.01); *G06V 10/82* (2022.01); *G06V 2201/03* (2022.01)

(58) Field of Classification Search
CPC .. G06V 10/82; G06V 10/774; G06V 2201/03; G06T 7/0014; G06T 7/0012
See application file for complete search history.

(56) References Cited

U.S. PATENT DOCUMENTS

2014/0379629 A1* 12/2014 Loew-Baselli ........ G16B 40/30
706/52

FOREIGN PATENT DOCUMENTS

EP          3432313 A1 *  1/2019 ............. G16H 50/20
WO  WO-2021168146 A1 *  8/2021 ............. G16B 20/10

OTHER PUBLICATIONS

Angelopoulos et al; "Image-to-image regression with distribution-free uncertainty quantification and applications in imaging"; In International Conference on Machine Learning, PMLR,(Jun. 2022) (Year: 2022).*
Dosovitskiy, et al. "You only train once: Loss-conditional training of deep networks." International conference on learning representations. (Year: 2019).*
Perez et al. "Film: Visual reasoning with a general conditioning layer." Proceedings of the AAAI conference on artificial intelligence (Year: 2018).*
Dosovitskiy, A. et al. | "You only train once: Loss-conditional training of deep networks." International conference on learning representations, 2019, 17 pages.
Perez, E. et al. | "Film: Visual reasoning with a general conditioning layer." Proceedings of the AAAI Conference on Artificial Intelligence. vol. 32. No. 1. 2018, 10 pages.
Scikit Learn | "Prediction Intervals for Gradient Boosting Regression." Wepage https://scikit-learn.org/stable/auto_examples/ensemble/plot_gradient_boosting_quantile.html, last accessed Oct. 14, 2022, 8 pages.

* cited by examiner

*Primary Examiner* — Shaghayegh Azima
(74) *Attorney, Agent, or Firm* — Amin, Turocy & Watson, LLP

(57) ABSTRACT

Systems/techniques that facilitate variable confidence machine learning are provided. In various embodiments, a system can access a medical image. In various aspects, the system can perform, via execution of a machine learning model, a regression task on the medical image, wherein the machine learning model can receive as input both the medical image and a user-specified confidence indicator.

20 Claims, 13 Drawing Sheets

VARIABLE CONFIDENCE MACHINE LEARNING

TECHNICAL FIELD

The subject disclosure relates generally to machine learning, and more specifically to variable confidence machine learning.

BACKGROUND

A machine learning model can be trained to perform a regression task on a medical image. To convey with how much uncertainty the machine learning model performs the regression task, the machine learning model can be configured to generate an interval of regression task results corresponding to the medical image. The width of such interval can depend upon whatever confidence quantile on which the machine learning model was trained. When existing techniques are implemented, a separate machine learning model must be trained to perform the regression task for each unique confidence quantile that is desired. Accordingly, existing techniques can be considered as consuming excessive amounts of computing resources.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatus or computer program products that facilitate variable confidence machine learning are described.

According to one or more embodiments, a system is provided. The system can comprise a non-transitory computer-readable memory that can store computer-executable components. The system can further comprise a processor that can be operably coupled to the non-transitory computer-readable memory and that can execute the computer-executable components stored in the non-transitory computer-readable memory. In various embodiments, the computer-executable components can comprise an access component that can access a medical image. In various aspects, the computer-executable components can comprise an execution component that can perform, via execution of a machine learning model, a regression task on the medical image. In various cases, the machine learning model can receive as input both the medical image and a user-specified confidence indicator.

According to one or more embodiments, the above-described system can be implemented as a computer-implemented method or a computer program product.

DETAILED DESCRIPTION

Figure 1:
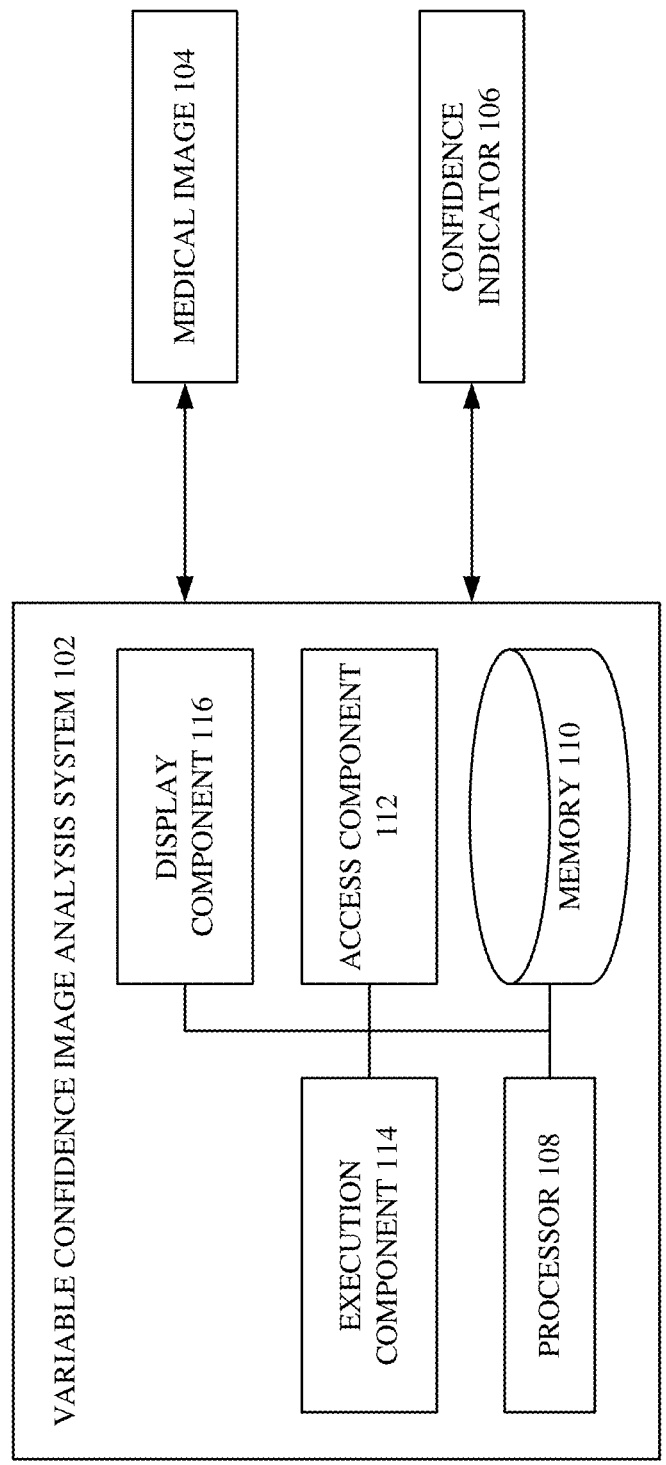
FIG. 1 illustrates a block diagram of an example, non-limiting system that facilitates variable confidence machine learning in accordance with one or more embodiments described herein.

The following detailed description is merely illustrative and is not intended to limit embodiments or application/uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

A machine learning model (e.g., a deep learning neural network) can be trained (e.g., via supervised training, unsupervised training, reinforcement learning) to perform a regression task (e.g., image quality enhancement, image denoising, image kernel transformation) on medical images (e.g., scanned/reconstructed images generated by a computed tomography (CT) scanner, scanned/reconstructed images generated by a magnetic resonance imaging (MRI) scanner, scanned/reconstructed images generated by a positron emission tomography (PET) scanner, scanned/reconstructed images generated by an X-ray scanner, scanned/reconstructed images generated by an ultrasound scanner).

To convey with how much uncertainty the machine learning model performs the regression task, the machine learning model can be configured to generate an interval of regression task results corresponding to the medical image, as opposed to generating a single regression task result (e.g., a point-prediction) corresponding to the medical image. The width of such predicted interval can depend upon a confidence quantile (e.g., a scalar indicating a statistical confidence interval percentage) with which the machine learning model was trained. For example, when executed on the medical image, the machine learning model can generate a lower-bound regression task result and an upper-bound regression task result, where the lower-bound and the upper-bound can together be considered as defining (e.g., as demarcating bookends of) a predicted interval of regression task results associated with the medical image and associated with the confidence quantile on which the machine learning model was trained. More specifically, the machine learning model can be considered as indicating that the correct or accurate regression task result for the medical image lies, with a probability or likelihood indicated by the confidence quantile, somewhere in between the lower-bound and the upper-bound.

Note that, in various aspects, the width of the predicted interval of regression task results can vary directly with the confidence quantile on which the machine learning model was trained. Indeed, if the confidence quantile is assigned a larger value (e.g., closer to 100%), the predicted interval of regression task results can become wider (e.g., the difference or distance between the predicted lower-bound and the predicted upper-bound can grow). In contrast, if the confidence quantile is assigned a smaller value (e.g., closer to 0%), the predicted interval of regression task results can become narrower (e.g., the difference or distance between the predicted lower-bound and the predicted upper-bound can shrink).

However, further note that a wider predicted interval of regression task results can be considered as indicating higher variability of what the machine learning model believes to be the correct/accurate regression task result for the medical image. In other words, the wider the predicted interval, the more possible regression results there are for the medical image, and thus the less informative the predicted interval can be considered. In contrast, a narrower predicted interval of regression task results can be considered as indicating lower variability of what the machine learning model believes to be the correct/accurate regression task result for the medical image. That is, the narrower the predicted interval, the fewer possible regression results there are for the medical image, and thus the more informative the predicted interval can be considered.

Accordingly, the machine learning model can be trained with a higher confidence quantile, at the expense of yielding wider, and thus less informative, predicted intervals of regression task results (e.g., even though the machine learning model can have a higher likelihood of generating intervals that contain the correct/accurate regression task results, such intervals can be very wide and thus less informative to a user or operator of the machine learning model). On the other hand, the machine learning model can generate narrower, and thus more informative, intervals of regression task results, at the expense of being trained with a lower confidence quantile (e.g., even though the machine learning model can generate tighter, and thus more informative, intervals, there can be a lower likelihood that such tighter intervals contain the correct/accurate regression task results). In other words, there can be an inverse relationship between confidence of predicted intervals and informativeness of predicted intervals.

Due to such inverse relationship, different levels of confidence or informativeness can be desired in different situations or contexts. For example, suppose that the machine learning model is deployed in a high-stakes clinical setting (e.g., performing image resolution enhancement for CT scanned torso images of stage-III lung cancer patients). In such case, obtaining highly confident regression task results can be considered as being more important than obtaining very tight predicted intervals. Thus, in such case, the machine learning model can be trained using a high confidence quantile. On the other hand, suppose that the machine learning model is instead deployed in a low-stakes clinical setting (e.g., performing image resolution enhancement for X-ray scanned dental images of patients with dental tartar build-up). In such case, obtaining highly confident regression task results can be considered unnecessary, and obtaining tighter predicted intervals at the expense of intermediate confidence can be considered as acceptable. Thus, in such case, the machine learning model can instead be trained using an intermediate confidence quantile.

Unfortunately and as the inventors of various embodiments described herein recognized, when existing techniques are implemented, the confidence quantile on which the machine learning model is trained to perform the regression task is fixed and cannot be changed at inference time without retraining. In such case, a separate machine learning model must be trained to perform the regression task for each unique confidence quantile that is desired. For example, suppose that it is desired to perform the regression task using a 95% confidence quantile, an 80% confidence quantile, and a 65% confidence quantile. In such case, three separate machine learning models would be needed, each being separately trained using a respective confidence quantile: a first machine learning model trained to generate intervals of regression task results having 95% confidence, a second machine learning model trained to generate intervals of regression task results having 80% confidence, and a third machine learning model trained to generate intervals of regression task results having 65% confidence. As the number of desired confidence quantiles grows, this can result in a very large, unwieldy number of machine learning models (e.g., one unique machine learning model per unique confidence quantile) that are all trained to perform the same regression task, which can consume excessive amounts of computing resources. In particular, each of such large, unwieldy number of machine learning models can undergo separate training, which can collectively consume an excessive amount of time. Moreover, each of such large, unwieldy number of machine learning models can be electronically stored post-training, which can collectively consume an excessive amount of computer memory (e.g., can have a collectively large memory footprint). Furthermore, because a confidence quantile can be considered as a continuously variable scalar, a finite number of distinct and independently-trained machine learning models can be unable to collectively be trained on all possible confidence quantile values (e.g., there are an infinite number of possible confidence quantile values). For at least these reasons, the present inventors recognized that existing techniques that train machine learning models using fixed confidence quantiles can be disadvantageous.

Accordingly, systems or techniques that can address one or more of these technical problems can be desirable.

Various embodiments described herein can address one or more of these technical problems. One or more embodiments described herein can include systems, computer-implemented methods, apparatus, or computer program products that can facilitate variable confidence machine learning. In other words, the present inventors realized that various disadvantages caused by training machine learning models via fixed confidence quantiles can be ameliorated by training machine learning models via variable confidence quantiles. More specifically, the present inventors realized that, when the above-mentioned existing techniques are implemented, a machine learning model is configured to receive as an explicit input only a medical image on which it is desired to perform a regression task, and the internal parameters of the machine learning model are updated during training according to a defined, uniform, or otherwise fixed confidence quantile value (e.g., such defined, uniform, or otherwise fixed confidence quantile value can be used in an error or loss formula during backpropagation). Moreover, the present inventors realized that various disadvantages (e.g., excessive consumption of computing resources) of such existing techniques can be reduced by training the machine learning model to explicitly receive a confidence quantile value as input. In other words, the machine learning model can be configured to receive as input not just a medical image itself, but also any suitable confidence quantile value. By training the machine learning model to explicitly receive confidence quantiles as input, the machine learning model can learn how variations in confidence quantile can correspondingly influence regression task results (e.g., can correspondingly influence the width of outputted intervals of regression task results). Accordingly, such machine learning model can be applied across different confidence quantiles without having to be retrained and without having to train a separate machine learning model for each unique confidence quantile that is desired, unlike the above-mentioned existing techniques.

Various embodiments described herein can be considered as a computerized tool (e.g., any suitable combination of computer-executable hardware or computer-executable software) that can facilitate variable confidence machine learning. In various aspects, such computerized tool can comprise an access component, an execution component, or a display component.

In various embodiments, there can be a medical image. In various aspects, the medical image can depict one or more anatomical structures (e.g., tissues, organs, body parts, or portions thereof) of a medical patient (e.g., human, animal, or otherwise). In various instances, the medical image can exhibit any suitable format or dimensionality. For example, in some cases, the medical image can be a two-dimensional array of pixels. In other cases, the medical image can be a three-dimensional array of voxels. In various aspects, the medical image can be generated or otherwise captured by any suitable medical imaging device, such as a CT scanner, an MRI scanner, an X-ray scanner, a PET scanner, or an ultrasound scanner. In various instances, the medical image can have undergone any suitable image reconstruction technique (e.g., filtered back projection).

In various embodiments, there can be a confidence indicator that corresponds to the medical image. In various aspects, the confidence indicator can be any suitable electronic data that can specify, represent, convey, or otherwise indicate any suitable confidence quantile according to which it is desired to perform any suitable regression task on the medical image. In various instances, the regression task can be any suitable inferencing task that involves mapping the medical image as a whole or any portions thereof (e.g., mapping pixel values or voxel values of the medical image) to one or more continuously-variable output values. As a non-limiting example, the regression task can be image quality enhancement (e.g., to increase the visual quality of an inputted medical image, by predicting a new, continuously-variable value for each pixel or voxel of the inputted medical image). As another non-limiting example, the regression task can be image kernel transformation (e.g., to render an inputted medical image according to a different imaging kernel, such as a bone kernel or a soft tissue kernel, by predicting a new, continuously-variable value for each pixel or voxel of the inputted medical image). As yet another non-limiting example, the regression task can be image denoising (e.g., to reduce the amount of visual noise present in an inputted medical image, by predicting a new, continuously-variable value for each pixel or voxel of the inputted medical image). As still another non-limiting example, the regression task can be image segmentation (e.g., to determine to which of two or more possible classes each pixel or voxel of an inputted medical image belongs, by predicting continuously-variable probabilities/likelihoods that any given pixel or voxel of the inputted medical image belongs to the two or more possible classes). As even another non-limiting example, the regression task can be image classification (e.g., to determine to which of two or more possible classes an inputted medical image belongs, by predicting continuously-variable probabilities/likelihoods that the inputted medical image belongs to the two or more possible classes).

In any case, the confidence indicator can exhibit any suitable format, size, or dimensionality (e.g., can be one or more scalars, one or more vectors, one or more matrices, one or more tensors, one or more character strings, or any suitable combination thereof). As a non-limiting example, the confidence indicator can be a scalar whose value ranges between 0 and 1, and whose value can be considered as representing a confidence quantile (e.g., a statistical confidence interval) according to which it is desired to perform the regression task on the medical image. For instance, if the value of the confidence indicator is x for any suitable positive real number $x \in (0,1)$, then this can be considered as indicating that it is desired for the regression task to be performed on the medical image with 100x % confidence (e.g., according to a 100x % confidence interval). In various aspects, the confidence indicator can be specified by a user, a technician, or a medical professional associated with the medical image, via any suitable human-computer interface device (e.g., keyboard, keypad, touchscreen, computer mouse, voice command).

In various embodiments, the access component of the computerized tool can electronically receive or otherwise electronically access the medical image or the confidence indicator. In some aspects, the access component can electronically retrieve the medical image or the confidence indicator from any suitable centralized or decentralized data structures (e.g., graph data structures, relational data structures, hybrid data structures), whether remote from or local to the access component. For example, the access component can retrieve the medical image or the confidence indicator from whatever medical imaging device generated or captured the medical image. In any case, the access component can electronically obtain or access the medical image or the confidence indicator, such that other components of the computerized tool can electronically interact with (e.g., read, write, edit, copy, manipulate) the medical image or the confidence indicator.

In various aspects, the execution component of the computerized tool can electronically store, maintain, control, or otherwise access a machine learning model. In various instances, the machine learning model can exhibit any suitable artificial intelligence architecture. For example, the machine learning model can exhibit a deep learning neural network architecture. In such case, the machine learning model can include any suitable numbers of any suitable types of layers (e.g., input layer, one or more hidden layers, output layer, any of which can be convolutional layers, dense layers, non-linearity layers, pooling layers, batch normalization layers, or padding layers), can include any suitable numbers of neurons in various layers (e.g., different layers can have the same or different numbers of neurons as each other), can include any suitable activation functions (e.g., softmax, sigmoid, hyperbolic tangent, rectified linear unit) in various neurons (e.g., different neurons can have the same or different activation functions as each other), or can include any suitable interneuron connections or interlayer connections (e.g., forward connections, skip connections, recurrent connections). In other cases, the machine learning model can exhibit any other suitable artificial intelligence architecture (e.g., support vector machine, naïve Bayes, linear regression, logistic regression, decision tree, random forest).

In various aspects, the machine learning model can be configured to perform the regression task on an inputted medical image. More specifically, the machine learning model can be configured to receive a medical image as input and to produce an interval or range of outputs corresponding to the regression task. For example, if the regression task is image quality enhancement, then the machine learning model can be configured to produce an interval or range of quality-enhanced versions of the inputted medical image. As another example, if the regression task is image kernel transformation, then the machine learning model can be configured to produce an interval or range of kernel-transformed versions of the inputted medical image. As still another example, if the regression task is image denoising, then the machine learning model can be configured to produce an interval or range of denoised versions of the inputted medical image. As yet another example, if the regression task is image segmentation, then the machine learning model can be configured to produce an interval or range of pixel-wise or voxel-wise segmentation probabilities for the inputted medical image. As even another example, if the regression task is image classification, then the machine learning model can be configured to produce an interval or range of classification probabilities for the inputted medical image.

However, rather than being configured to receive as input any given medical image alone, the machine learning model can be configured to receive as input the given medical image and a given confidence indicator corresponding to that given medical image (e.g., representing a user-specified confidence quantile according to which it is desired for the regression task to be performed on the given medical image).

Accordingly, in various aspects, the execution component can electronically execute the machine learning model on the medical image and the confidence indicator that are accessed by the access component. In various instances, such execution can cause the machine learning model to generate a regression task interval. As a non-limiting example, the machine learning model can exhibit a deep learning neural network architecture. In such case, the execution component can feed the medical image and the confidence indicator to an input layer of the machine learning model, the medical image and the confidence indicator can complete a forward pass through one or more hidden layers of the machine learning model, and an output layer of the machine learning model can compute the regression task interval based on activations from the one or more hidden layers. More specifically still, in various aspects, a conditioning layer of the machine learning model can be in parallel with the input layer of the machine learning model. In such case, the execution component can feed the medical image to the input layer, the execution component can feed the confidence indicator to the conditioning layer, and activations from the input layer and the conditioning layer can complete forward passes through the one or more hidden layers and through the output layer, thereby yielding the regression task interval. In various instances, the conditioning layer can be a Feature-wise Linear Modulation (FiLM) layer.

No matter the artificial intelligence architecture of the machine learning model, the execution component can feed the medical image and the confidence indicator to the machine learning model, which can cause the machine learning model to produce the regression task interval.

In various aspects, the regression task interval can be defined or otherwise demarcated by a lower-bound regression task output and an upper-bound regression task output. In various instances, the lower-bound regression task output can be considered as a numerically-lowest result that the machine learning model determines should be obtained when the regression task is performed on the medical image with a confidence level or percentage represented by the confidence indicator. Similarly, the upper-bound regression task output can be considered as a numerically-highest result that the machine learning model determines should be obtained when the regression task is performed on the medical image with a confidence level or percentage represented by the confidence indicator. Accordingly, the lower-bound regression task output and the upper-bound regression task output can be considered as bookends of the regression task interval. In any case, the machine learning model can be considered as concluding that the true, correct, or accurate regression task result for the medical image lies, with a probability or likelihood represented by the confidence indicator, somewhere within the regression task interval (e.g., somewhere in between the lower-bound regression task output and the upper-bound regression task output).

In various aspects, formats or dimensionalities of the lower-bound regression task output and the upper-bound regression task output can correspond to the regression task that the machine learning model is configured to perform. For example, suppose that the regression task is image quality enhancement. In such case, the lower-bound regression task output can be considered as a quality-enhanced version of the medical image, where each pixel or voxel of such quality-enhanced version can have the numerically lowest value (e.g., numerically lowest Hounsfield unit value) that the machine learning model believes should be assigned to that pixel or voxel in view of the confidence indicator. Likewise, the upper-bound regression task output can be considered as a quality-enhanced version of the medical image, where each pixel or voxel of such quality-enhanced version can have the numerically highest value (e.g., numerically highest Hounsfield unit value) that the machine learning model believes should be assigned to that pixel or voxel in view of the confidence indicator.

As another example, suppose that the regression task is image denoising. In such case, the lower-bound regression task output can be considered as a denoised version of the medical image, where each pixel or voxel of such denoised version can have the numerically lowest value that the machine learning model believes should be assigned to that pixel or voxel in view of the confidence indicator. Similarly, the upper-bound regression task output can be considered as a denoised version of the medical image, where each pixel or voxel of such denoised version can have the numerically highest value that the machine learning model believes should be assigned to that pixel or voxel in view of the confidence indicator.

As yet another example, suppose that the regression task is image kernel transformation. In such case, the lower-bound regression task output can be considered as a kernel-transformed version of the medical image, where each pixel or voxel of such kernel-transformed version can have the numerically lowest value that the machine learning model believes should be assigned to that pixel or voxel in view of the confidence indicator. Likewise, the upper-bound regression task output can be considered as a kernel-transformed version of the medical image, where each pixel or voxel of such kernel-transformed version can have the numerically highest value that the machine learning model believes should be assigned to that pixel or voxel in view of the confidence indicator.

As even another example, suppose that the regression task is image segmentation. In such case, the lower-bound regression task output can be considered as a segmentation mask of the medical image, where each pixel or voxel of such segmentation mask can have the numerically lowest class probability value that the machine learning model believes should be assigned to that pixel or voxel in view of the confidence indicator. Similarly, the upper-bound regression task output can be considered as a segmentation mask of the medical image, where each pixel or voxel of such segmentation mask can have the numerically highest class probability value that the machine learning model believes should be assigned to that pixel or voxel in view of the confidence indicator.

As still another example, suppose that the regression task is image classification. In such case, the lower-bound regression task output can be considered as a classification label of the medical image, where such classification label can have the numerically lowest class probability value that the machine learning model believes should be assigned to the medical image in view of the confidence indicator. Likewise, the upper-bound regression task output can be considered as a classification label of the medical image, where such classification label can have the numerically highest class probability value that the machine learning model believes should be assigned to the medical image in view of the confidence indicator.

In various embodiments, the display component of the computerized tool can electronically render, on any suitable electronic display (e.g., computer screen, computer monitor), any suitable graphical user-interface based on the regression task interval generated by the machine learning model. As an example, the graphical user-interface can depict or otherwise visually illustrate the lower-bound regression task output and the upper-bound regression task output. As another example, the display component can compute a difference (e.g., an element-wise difference) between the lower-bound regression task output and the upper-bound regression task output, and the graphical user-interface can depict or otherwise visually illustrate such difference. In any case, a user, technician, or medical professional can visually inspect or view the graphical user-interface as rendered on the electronic display, so as to become aware of the regression task interval produced by the machine learning model (e.g., the graphical user-interface can aid or assist the user, technician, or medical professional for diagnostic or prognostic purposes).

To help cause the regression task interval to be accurate, the machine learning model can first undergo any suitable type or paradigm of training (e.g., supervised training, unsupervised training, reinforcement learning). Accordingly, in various aspects, the access component can receive, retrieve, or otherwise access a training dataset, and the computerized tool can comprise a training component that can train the machine learning model on the training dataset.

In some instances, the training dataset can be an annotated training dataset. In such cases, the training dataset can include a set of training inputs and a set of ground-truth annotations that respectively correspond to the set of training inputs. In various aspects, a training input can include a training medical image (e.g., having the same format or dimensionality as the medical image discussed above) and a training confidence indicator (e.g., having the same format or dimensionality as the confidence indicator discussed above), where the training confidence indicator can represent a unique confidence quantile or confidence percentage according to which it is desired to perform the regression task on the training medical image. In various instances, a ground-truth annotation (e.g., having the same format or dimensionality as the regression task interval discussed above) can be considered as indicating the correct or accurate regression task interval that is known or deemed to correspond to a respective training input. In other words, for any given training input, a ground-truth annotation corresponding to that training input can indicate a correct/accurate lower-bound regression task output and a correct/accurate upper-bound regression task output that are known or otherwise deemed to correspond to the given training input.

If the training dataset is annotated, then the training component can, in various aspects, perform supervised training on the machine learning model. Prior to the start of such supervised training, the internal parameters (e.g., weights, biases, convolutional kernels) of the machine learning model can be randomly initialized.

In various aspects, the training component can select from the training dataset any suitable training input and any suitable ground-truth annotation corresponding to such selected training input. In various instances, the training component can feed the selected training input to the machine learning model, which can cause the machine learning model to produce some output. For example, if the machine learning model is a deep learning neural network, then the training component can feed a training medical image specified in the selected training input to an input layer of the machine learning model, the training component can feed a training confidence indicator specified in the selected training input to a conditioning layer (e.g., FiLM) of the machine learning model, the training medical image and the training confidence indicator can complete a forward pass through one or more hidden layers of the machine learning model, and an output layer of the machine learning model can calculate the output based on activations from the one or more hidden layers.

In various aspects, the output can be considered as the predicted or inferred regression task interval (e.g., predicted/inferred lower-bound regression task output and predicted/inferred upper-bound regression task output) which the machine learning model determines should correspond to the selected training input. In contrast, the selected ground-truth annotation can be considered as a correct or accurate regression task interval (e.g., correct/accurate lower-bound regression task output and correct/accurate upper-bound regression task output) that is known or deemed to correspond to the selected training input. Note that, if the machine learning model has so far undergone no or little training, then the output can be highly inaccurate (e.g., the output can be very different from the selected ground-truth annotation). Furthermore, note that, in various cases, the dimensionality of the output can be controlled or otherwise determined by the number of neurons in the output layer (e.g., lower-bound and upper-bound regression task outputs of desired dimensionalities can be achieved by adding neurons to or removing neurons from the output layer).

In various aspects, the training component can compute any suitable error or loss (e.g., mean absolute error (MAE), mean squared error (MSE), cross-entropy) between the output and the selected ground-truth annotation. In some cases, such error or loss can be based on the training confidence indicator specified in the selected training input. As a non-limiting example, the error or loss can be computed using a quantile regression loss function which can take as an argument not just the output and the selected ground-truth annotation, but also the training confidence indicator. In any case, the training component can update the internal parameters of the machine learning model by performing backpropagation (e.g., stochastic gradient descent) driven by the computed error or loss.

In various instances, such supervised training procedure can be repeated for each training input in the training dataset, with the result being that the internal parameters of the machine learning model can become iteratively optimized to accurately generate regression task intervals based on inputted medical images and inputted confidence indicators. In various cases, the training component can implement any suitable training batch sizes, any suitable training termination criteria, or any suitable error, loss, or objective functions.

In any case, the machine learning model can be configured or otherwise trained to receive as input both a medical image and a corresponding or desired confidence indicator, and to produce as output a regression task interval based on both that medical image and that confidence indicator. Indeed, if the confidence indicator is x for any suitable positive real number x where 0<x<1, then the regression task interval can be considered as having a 100x % likelihood of containing the correct or accurate regression task result for the medical image (e.g., as mentioned above, the width of the predicted regression task interval can grow as x gets closer to 1 and can shrink as x gets closer to 0). Accordingly, the machine learning model can be considered as explicitly taking into consideration whatever confidence indicator according to which it is desired to perform the regression task on any given inputted medical image. By being trained to explicitly receive as input such confidence indicators, the machine learning model can be considered as learning how variations in confidence indicators can influence or otherwise affect predicted regression task intervals. In other words, the internal parameters of the machine learning model can, after training, be considered as adjusting how any given medical image is analyzed, based on the particular confidence indicator that is specified for that given medical image.

For example, suppose that the machine learning model is fed a first medical image and a first confidence indicator, thereby yielding a first regression task interval. Now, if the machine learning model is fed that same first medical image and a second confidence indicator that is different from the first confidence indicator, then the machine learning model can generate a second regression task interval that is different from the first regression task interval (e.g., if the second confidence indicator is lesser than the first confidence indicator, the second regression task interval can be narrower than the first regression task interval; if the second confidence indicator is greater than the first confidence indicator, the second regression task interval can be wider than the first regression task interval). That is, the second regression task interval can be different from the first regression task interval, notwithstanding that they can both be based on the first medical image. Accordingly, how the machine learning model analyzes any given medical image can depend upon whichever confidence indicator (e.g., whichever confidence quantile or confidence percentage) is specified for that given medical image.

Because the machine learning model can explicitly receive user-specified confidence indicators as input, the machine learning model can be applied across different confidence indicators without having to be retrained and without having to train a separate machine learning model for each unique confidence indicator that is desired, unlike existing techniques.

Various embodiments described herein can be employed to use hardware or software to solve problems that are highly technical in nature (e.g., to facilitate variable confidence machine learning), that are not abstract and that cannot be performed as a set of mental acts by a human. Further, some of the processes performed can be performed by a specialized computer (e.g., a machine learning model having internal parameters such as convolutional kernels) for carrying out defined tasks related to variable confidence machine learning. For example, such defined tasks can include: accessing, by a device operatively coupled to a processor, a medical image; and performing, by the device and via execution of a machine learning model, a regression task on the medical image, wherein the machine learning model receives as input both the medical image and a user-specified confidence indicator.

Such defined tasks are not performed manually by humans. Indeed, neither the human mind nor a human with pen and paper can electronically access a medical image (e.g., a two-dimensional pixel array, a three-dimensional voxel array) and a confidence indicator describing or otherwise representing a statistical confidence quantile according to which it is desired to perform a regression task on the medical image, and electronically execute a machine learning model (e.g., a deep learning neural network) on both the medical image and the confidence indicator, so as to perform the regression task on the medical image. Indeed, a machine learning model is an inherently-computerized construct that simply cannot be implemented in any way by the human mind without computers. Accordingly, a computerized tool that can train or execute a machine learning model on both a medical image and a confidence indicator is likewise inherently-computerized and cannot be implemented in any sensible, practical, or reasonable way without computers.

Moreover, various embodiments described herein can integrate into a practical application various teachings relating to variable confidence machine learning. As explained above, some existing techniques train a machine learning model to perform a regression task according to a fixed confidence quantile. In such cases, the machine learning model cannot perform the regression task according to different confidence quantiles without undergoing retraining, which can be considered as a disadvantage. Indeed, in order for such techniques to facilitate the regression task according to different confidence quantiles, a separate machine learning model would have to be independently trained for each unique confidence quantile that is desired. This would unfortunately result in voluminous consumption of training time and computer memory.

Various embodiments described herein can address one or more of these technical problems. Specifically, the present inventors realized that various disadvantages of the above-mentioned existing techniques can be caused by the fact that such existing techniques account for confidence quantile only during training. Indeed, the present inventors realized that such disadvantages can be ameliorated by configuring or training a machine learning model to explicitly receive as input not just a medical image but also a confidence indicator specifying a confidence quantile or confidence percentage according to which it is desired to perform the regression task on the medical image. By receiving the confidence indicator as an explicit input feature, the machine learning model can, during training, be considered as learning how variations in confidence indicators (e.g., how variations in statistical confidence quantiles) correlate to variations in inferred/predicted regression task intervals. Thus, the machine learning model can be applied across different confidence indicators without requiring retraining and without separately training a unique machine learning model for each distinct confidence quantile that is desired, unlike existing techniques that use fixed confidence quantiles. Thus, various embodiments described herein certainly constitute a concrete and tangible technical improvement in the field of machine learning. Therefore, various embodiments described herein clearly qualify as useful and practical applications of computers.

Furthermore, various embodiments described herein can control real-world tangible devices based on the disclosed teachings. For example, various embodiments described herein can electronically execute (or train) real-world machine learning models on real-world medical images (e.g., CT images, MRI images, X-ray images, PET images, ultrasound images), and can electronically render any results produced by such real-world machine learning models on real-world computer screens.

It should be appreciated that the herein figures and description provide non-limiting examples of various embodiments and are not necessarily drawn to scale.

FIG. 1 illustrates a block diagram of an example, non-limiting system 100 that can facilitate variable confidence machine learning in accordance with one or more embodiments described herein. As shown, a variable confidence image analysis system 102 can be electronically integrated, via any suitable wired or wireless electronic connections, with a medical image 104 or with a confidence indicator 106.

In various embodiments, the medical image 104 can be any suitable image data that depicts any suitable anatomical structure of any suitable medical patient. As some non-limiting examples, the anatomical structure can be any suitable tissue of the medical patient (e.g., bone tissue, lung tissue, muscle tissue), any suitable organ of the medical patient (e.g., heart, liver, lung, brain), any suitable bodily fluid of the medical patient (e.g., blood, amniotic fluid), any other suitable body part of the medical patient, or any suitable portion thereof.

In various aspects, the medical image 104 can have any suitable format or dimensionality. As a non-limiting example, the medical image 104 can be an a-by-b pixel array of Hounsfield unit values, for any suitable positive integers a and b. As another non-limiting example, the medical image 104 can be an a-by-b-by-c voxel array of Hounsfield unit values, for any suitable positive integers a, b, and c.

In various embodiments, the medical image 104 can be generated or otherwise captured by any suitable medical imaging device, medical imaging equipment, or medical imaging modality (not shown). As a non-limiting example, the medical image 104 can be generated or otherwise captured by a CT scanner, in which case the medical image 104 can be considered as a CT scanned image. As another non-limiting example, the medical image 104 can be generated or otherwise captured by an MRI scanner, in which case the medical image 104 can be considered as an MRI scanned image. As yet another non-limiting example, the medical image 104 can be generated or otherwise captured by a PET scanner, in which case the medical image 104 can be considered as a PET scanned image. As still another non-limiting example, the medical image 104 can be generated or otherwise captured by an X-ray scanner, in which case the medical image 104 can be considered as an X-ray scanned image. As even another non-limiting example, the medical image 104 can be generated or otherwise captured by an ultrasound scanner, in which case the medical image 104 can be considered as an ultrasound scanned image. As another non-limiting example, the medical image 104 can be generated or otherwise captured by a visible-spectrum camera, in which case the medical image 104 can be considered as an image photographed in the visible spectrum.

In various embodiments, the confidence indicator 106 can be any suitable electronic data that represents, conveys, or otherwise signifies a statistical confidence quantile or a statistical confidence percentage according to which it is desired by a user, technician, or medical professional to perform a regression task on the medical image 104.

In various aspects, the regression task can be any suitable predictive task or inferencing task that can involve mapping the medical image 104 or any suitable portions thereof to one or more continuous (as opposed to discrete) output values. As a non-limiting example, the regression task can be image quality enhancement, which can involve mapping the current value of each given pixel or voxel (which value can be considered as continuous rather than discrete) of the medical image 104 to a new value, so as to improve the visual quality or resolution of the medical image 104. As another non-limiting example, the regression task can be image denoising, which can involve mapping the current value of each given pixel or voxel of the medical image 104 to a new value, so as to reduce the amount of visual noise present in the medical image 104. As yet another non-limiting example, the regression task can be image kernel transformation, which can involve mapping the current value of each given pixel or voxel of the medical image 104 to a new value, so as to depict or illustrate the medical image 104 according to a different imaging kernel. As even another non-limiting example, the regression task can be image classification, which can involve assigning to the medical image 104 a classification probability value, which classification probability value indicates how likely it is that the medical image 104 belongs to a given class. As still another non-limiting example, the regression task can be image segmentation, which can involve assigning to each pixel or voxel of the medical image 104 a classification probability value, which classification probability value indicates how likely it is that such pixel or voxel belongs to a given class.

In various instances, the confidence indicator 106 can be specified, selected, or otherwise chosen by a user, technician, or medical professional associated with the medical image 104, via any suitable human-computer interface device (not shown). In some cases, such human-computer interface device can be electronically integrated with the variable confidence image analysis system 102. In other cases, such human-computer interface device can be electronically integrated with whatever medical imaging device generated or captured the medical image 104. As some non-limiting examples, the human-computer interface device can comprise a keyboard, a keypad, a computer mouse, a touchscreen, or voice controls.

In various aspects, the confidence indicator 106 can exhibit any suitable format or dimensionality. That is, the confidence indicator 106 can be one or more scalars, one or more vectors, one or more matrices, one or more tensors, one or more character strings, or any suitable combination thereof. As a non-limiting example, the confidence indicator 106 can be a scalar, the value or magnitude of which can be any suitable real number that is greater than 0 and less than 1. In such case, the confidence indicator 106 can be considered as representing a percentage of statistical confidence according to which it is desired to perform the regression task on the medical image 104. For instance, suppose that the confidence indicator 106 has a value or magnitude of 0.92. This can accordingly be interpreted to mean that whoever specified or selected the confidence indicator 106 desires that the regression task be performed on the medical image 104 with 92% confidence. In another non-limiting instance, suppose that the confidence indicator 106 instead has a value or magnitude of 0.67. This can accordingly be interpreted to mean that whoever specified or selected the confidence indicator 106 desires that the regression task be performed on the medical image 104 with 67% confidence. In yet another non-limiting instance, suppose that the confidence indicator 106 instead has a value or magnitude of 0.59. This can accordingly be interpreted to mean that whoever specified or selected the confidence indicator 106 desires that the regression task be performed on the medical image 104 with 59% confidence.

Thus, in various aspects, the confidence indicator 106 can be considered as representing a statistical confidence percentage according to which it is desired to perform the regression task on the medical image 104. As described herein, the variable confidence image analysis system 102 can facilitate the performance of the regression task on the medical image 104 according to the confidence indicator 106.

In various embodiments, the variable confidence image analysis system 102 can comprise a processor 108 (e.g., computer processing unit, microprocessor) and a non-transitory computer-readable memory 110 that is operably or operatively or communicatively connected or coupled to the processor 108. The non-transitory computer-readable memory 110 can store computer-executable instructions which, upon execution by the processor 108, can cause the processor 108 or other components of the variable confidence image analysis system 102 (e.g., access component 112, execution component 114, display component 116) to perform one or more acts. In various embodiments, the non-transitory computer-readable memory 110 can store computer-executable components (e.g., access component 112, execution component 114, display component 116), and the processor 108 can execute the computer-executable components.

In various embodiments, the variable confidence image analysis system 102 can comprise an access component 112. In various aspects, the access component 112 can electronically receive or otherwise electronically access the medical image 104 or the confidence indicator 106. In various instances, the access component 112 can electronically retrieve the medical image 104 or the confidence indicator 106 from any suitable centralized or decentralized data structures (not shown) or from any suitable centralized or decentralized computing devices (not shown). As a non-limiting example, whatever medical imaging device generated or captured the medical image 104 can transmit the medical image 104 or the confidence indicator 106 to the access component 112. In any case, the access component 112 can electronically obtain or access the medical image 104 or the confidence indicator 106, such that other components of the variable confidence image analysis system 102 can electronically interact with the medical image 104 or with the confidence indicator 106.

In various embodiments, the variable confidence image analysis system 102 can comprise an execution component 114. In various aspects, as described herein, the execution component 114 can execute a machine learning model on both the medical image 104 and the confidence indicator 106, thereby yielding a regression task interval.

In various embodiments, the variable confidence image analysis system 102 can comprise a display component 116. In various instances, as described herein, the display component 116 can transmit the regression task interval to any suitable computing devices, or can render the regression task interval on any suitable computer display.

Figure 2:
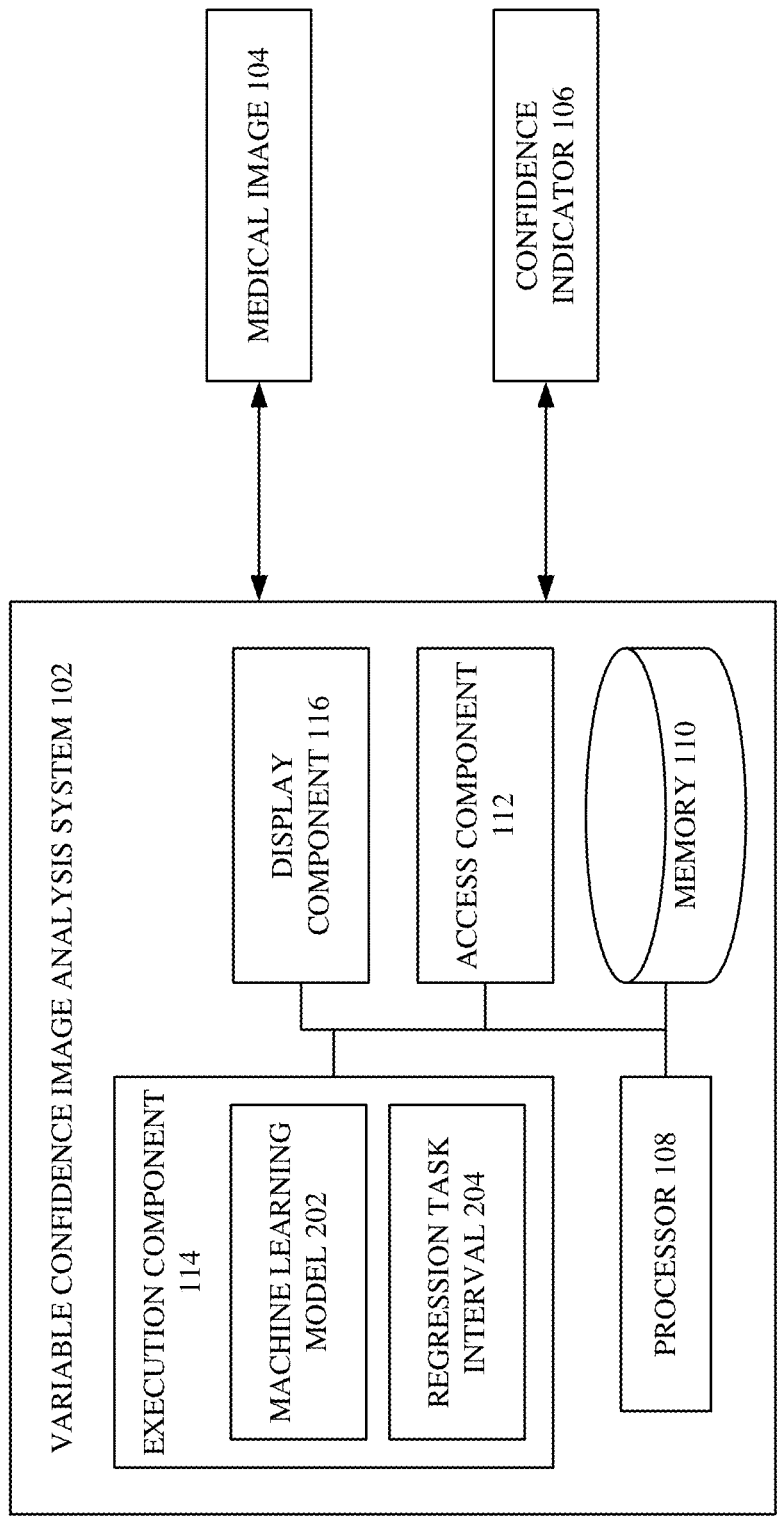
FIG. 2 illustrates a block diagram of an example, non-limiting system including a machine learning model and a regression task interval that facilitates variable confidence machine learning in accordance with one or more embodiments described herein.

FIG. 2 illustrates a block diagram of an example, non-limiting system 200 including a machine learning model and a regression task interval that can facilitate variable confidence machine learning in accordance with one or more embodiments described herein. As shown, the system 200 can, in some cases, comprise the same components as the system 100, and can further comprise a machine learning model 202 and a regression task interval 204.

In various embodiments, the execution component 114 can electronically store, electronically maintain, electronically control, or otherwise electronically access the machine learning model 202. In various aspects, the machine learning model 202 can have or otherwise exhibit any suitable artificial intelligence architecture. As a non-limiting example, the machine learning model 202 can have or otherwise exhibit a deep learning neural network architecture. As another non-limiting example, the machine learning model 202 can have or otherwise exhibit a support vector machine architecture. As yet another non-limiting example, the machine learning model 202 can have or otherwise exhibit a naïve Bayes architecture. As still another non-limiting example, the machine learning model 202 can have or otherwise exhibit a linear or logistic regression architecture. As even another non-limiting example, the machine learning model 202 can have or otherwise exhibit a decision tree architecture.

No matter the internal architecture of the machine learning model 202, the machine learning model 202 can be configured to perform the regression task on inputted medical images. Furthermore, no matter the internal architecture of the machine learning model 202, and no matter the regression task performable by the machine learning model 202, the machine learning model 202 can be configured to receive as input both a medical image and a user-specified confidence indicator representing a statistical confidence percentage according to which it is desired to perform the regression task on the medical image. Accordingly, in various aspects, the execution component 114 can electronically execute the machine learning model 202 on both the medical image 104 and the confidence indicator 106, which can cause the machine learning model 202 to produce as output the regression task interval 204. Various non-limiting aspects are further discussed with respect to FIGS. 3-4.

Figure 3:
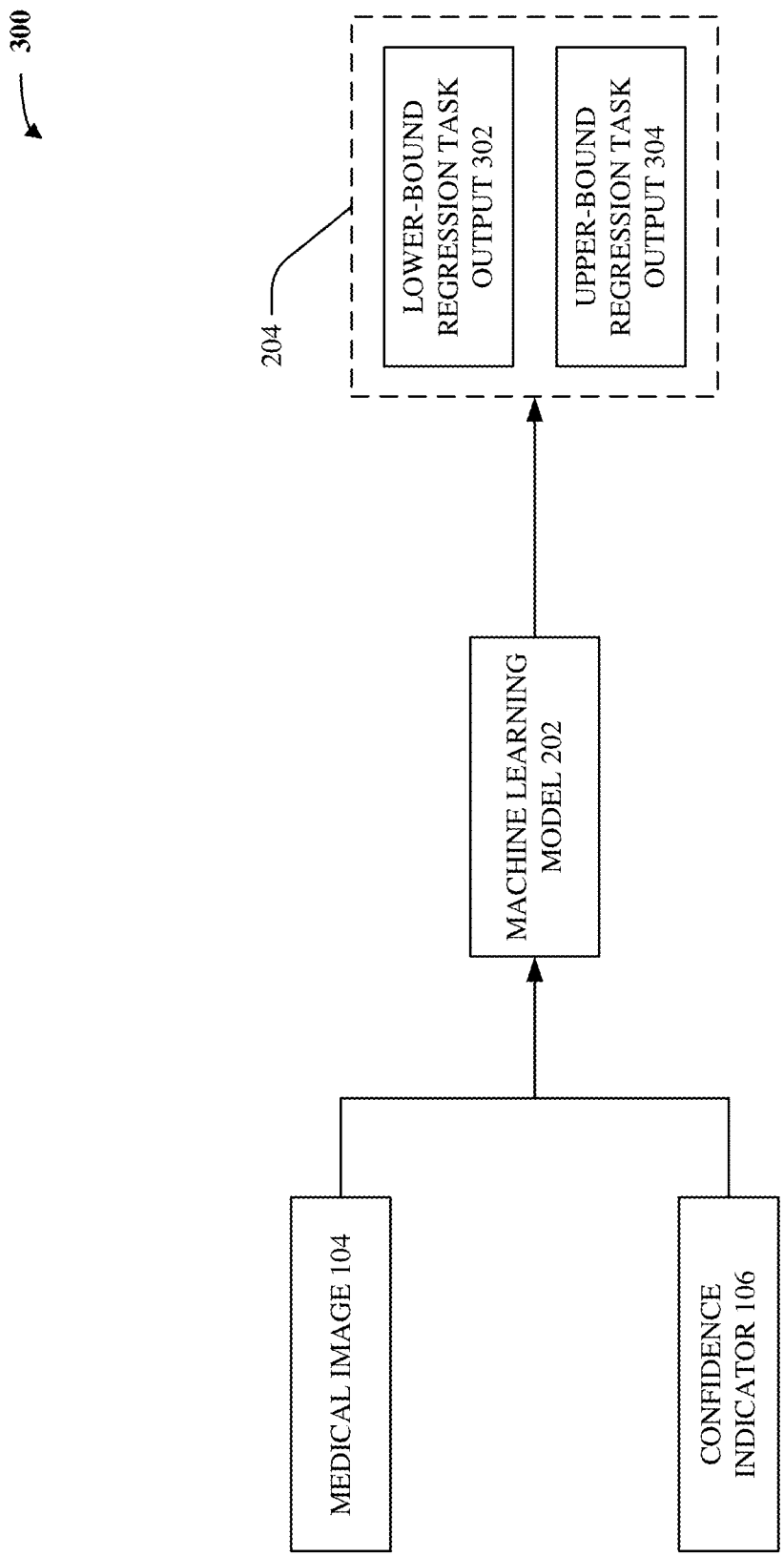
FIGS. 3-4 illustrate example, non-limiting block diagrams showing how a machine learning model can generate a set of inferencing task outputs in accordance with one or more embodiments described herein.
Figure 4:
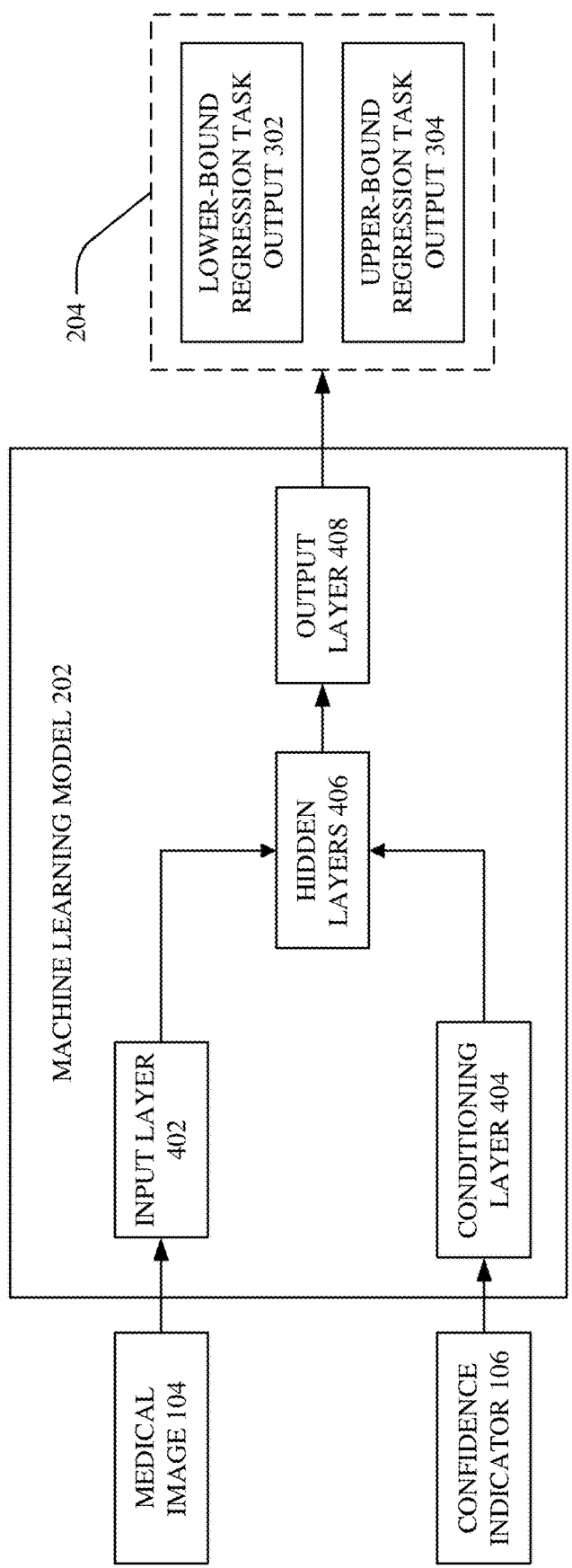

FIGS. 3-4 illustrate example, non-limiting block diagrams 300 and 400 showing how the machine learning model 202 can generate the regression task interval 204 in accordance with one or more embodiments described herein.

First, consider FIG. 3. As shown, the execution component 114 can, in various aspects, feed both the medical image 104 and the confidence indicator 106 as input to the machine learning model 202. In other words, the machine learning model 202 can be configured to receive the medical image 104 as an explicit input feature and can be configured to receive the confidence indicator 106 as an additional explicit input feature. In various instances, both the medical image 104 (e.g., which can be a pixel array or a voxel array) and the confidence indicator 106 (e.g., which can be a scalar) can complete forward passes through the internal architecture of the machine learning model 202, which can cause the machine learning model 202 to produce the regression task interval 204 as a result.

In various aspects, as shown, the regression task interval 204 can comprise a lower-bound regression task output 302 and an upper-bound regression task output 304. In various instances, the lower-bound regression task output 302 can be any suitable electronic data that can be considered as a result of performing the regression task on the medical image 104. Accordingly, a format or dimensionality of the lower-bound regression task output 302 can depend upon the regression task. For example, if the regression task is image quality enhancement, then the lower-bound regression task output 302 can be considered as a quality-enhanced version of the medical image 104. As another example, if the regression task is image denoising, then the lower-bound regression task output 302 can be considered as a denoised version of the medical image 104. As yet another example, if the regression task is image kernel transformation, then the lower-bound regression task output 302 can be considered as a kernel-transformed version of the medical image 104. As even another example, if the regression task is image classification, then the lower-bound regression task output 302 can be considered as a class probability value corresponding to the medical image 104. As still another example, if the regression task is image segmentation, then the lower-bound regression task output 302 can be considered as a segmentation mask indicating class probability values respectively corresponding to the individual pixels or voxels of the medical image 104.

Similarly, the upper-bound regression task output 304 can also be any suitable electronic data that can be considered as a result of performing the regression task on the medical image 104. Accordingly, a format or dimensionality of the upper-bound regression task output 304 can depend upon the regression task. For instance, if the regression task is image quality enhancement, then the upper-bound regression task output 304 can be considered as a quality-enhanced version of the medical image 104. As another instance, if the regression task is image denoising, then the upper-bound regression task output 304 can be considered as a denoised version of the medical image 104. As yet another instance, if the regression task is image kernel transformation, then the upper-bound regression task output 304 can be considered as a kernel-transformed version of the medical image 104. As even another instance, if the regression task is image classification, then the upper-bound regression task output 304 can be considered as a class probability value corresponding to the medical image 104. As still another instance, if the regression task is image segmentation, then the upper-bound regression task output 304 can be considered as a segmentation mask indicating class probability values respectively corresponding to the individual pixels or voxels of the medical image 104.

In any case, any numerical values of the lower-bound regression task output 302 can be respectively lesser than (or equal to) those of the upper-bound regression task output 304. Accordingly, the lower-bound regression task output 302 and the upper-bound regression task output 304 can be considered as bookends that define or otherwise demarcate the regression task interval 204.

In various aspects, the regression task interval 204 can be considered as having a confidence probability or a confidence percentage given by the confidence indicator 106. That is, whatever regression task result that is true, correct, or accurate for the medical image 104 can lie, with a probability or likelihood represented by the confidence indicator 106, within the regression task interval 204 (e.g., between the lower-bound regression task output 302 and the upper-bound regression task output 304).

As a non-limiting example, suppose that the medical image 104 is an a-by-b array of pixels for any suitable positive integers a and b. Furthermore, suppose that the regression task is image denoising. Further still, suppose that the confidence indicator 106 is a scalar having a value of x for $0<x<1$. In such case, the lower-bound regression task output 302 can be considered as a predicted denoised version of the medical image 104. That is, the lower-bound regression task output 302 can be an a-by-b array of pixels, whose pixels collectively exhibit less visual noise than the pixels of the medical image 104. Likewise, in such case, the upper-bound regression task output 304 can be considered as another predicted denoised version of the medical image 104. That is, the upper-bound regression task output 304 can also be an a-by-b array of pixels, whose pixels collectively exhibit less visual noise than the pixels of the medical image 104. Now, in various instances, the pixel values or voxel values of the lower-bound regression task output 302 can be lesser than respective pixel values or voxel values of the upper-bound regression task output 304, and the true, correct, or accurate denoised pixel values or voxel values of the medical image 104 can have a 100x % chance or probability of being numerically between the pixel values or voxels values of the lower-bound regression task output 302 and the pixel values or voxel values of the upper-bound regression task output 304.

To help clarify, let $M(i,j)$ represent the value of the pixel located in row i and column j of the medical image 104, for any suitable positive integers $i \leq a$ and $j \leq b$. Similarly, let $L(i,j)$ represent the value of the pixel located in row i and column j of the lower-bound regression task output 302. Likewise, let $U(i,j)$ represent the value of the pixel located in row i and column j of the upper-bound regression task output 304. In various aspects, $L(i,j)<U(i,j)$. Accordingly, $L(i,j)$ and $U(i,j)$ can be considered as forming, defining, or otherwise demarcating a range or interval of possible denoised values for $M(i,j)$, where the true, correct, or otherwise accurate denoised value for $M(i,j)$ has a 100x % chance of being within that range or interval. In other words, the machine learning model 202 can predict or infer that the true, correct, or accurate denoised value for $M(i,j)$ has a 100x % likelihood of being greater than or equal to $L(i,j)$ and of being less than or equal to $U(i,j)$. Because this can be the case for each pixel in the medical image 104, the lower-bound regression task output 302 and the upper-bound regression task output 304 can be considered as defining or demarcating a range or interval of denoised images (e.g., defining or demarcating the regression task interval 204), where the correct, accurate, or true denoised version of the medical image 104 has a 100x % chance of lying within that range or interval.

As another non-limiting example, suppose that the medical image 104 is an a-by-b array of pixels for any suitable positive integers a and b. Furthermore, suppose that the regression task is binary image classification. Further still, suppose that the confidence indicator 106 is a scalar having a value of x for $0<x<1$. In such case, the lower-bound regression task output 302 can be considered as a predicted probability value (e.g., a scalar, rather than an a-by-b array of pixels) indicating a likelihood that the medical image 104 belongs to one of two possible classes. Likewise, in such case, the upper-bound regression task output 304 can be considered as a predicted probability value (e.g., again, a scalar, rather than an a-by-b array of pixels) indicating another likelihood that the medical image 104 belongs to that same one of the two possible classes. Now, in various instances, the lower-bound regression task output 302 can be lesser than the upper-bound regression task output 304. Accordingly, the lower-bound regression task output 302 and the upper-bound regression task output 304 can be considered as defining or demarcating a range or interval of class probability values (e.g., as defining or demarcating the regression task interval 204), and the true, correct, or accurate class probability value of the medical image 104 can have a 100x % likelihood of being within that range or interval (e.g., of being greater than or equal to the lower-bound regression task output 302 and of being less than or equal to the upper-bound regression task output 304).

In any case, the regression task interval 204 (e.g., the lower-bound regression task output 302 and the upper-bound regression task output 304) can be considered as not being a mere function of the medical image 104 alone. Instead, because the machine learning model 202 can explicitly receive both the medical image 104 and the confidence indicator 106 as input, the regression task interval 204 (e.g., the lower-bound regression task output 302 and the upper-bound regression task output 304) can be considered as being a function of (e.g., can be considered as depending upon) both the medical image 104 and the confidence indicator 106. In other words, the regression task interval 204 (e.g., the lower-bound regression task output 302 and the upper-bound regression task output 304) can, in various cases, be altered by changes in the confidence indicator 106, even if no changes are made to the medical image 104.

In various aspects, the machine learning model 202 can be configured to receive as input both the medical image 104 and the confidence indicator 106, regardless of the internal architecture exhibited by the machine learning model 202 (e.g., regardless of whether the machine learning model 202 is a deep learning neural network, is a support vector machine, is a naïve Bayes model, is a linear or logistic regression model, or is a decision tree model). However, in some non-limiting instances, the machine learning model 202 can be a deep learning neural network, as described with respect to FIG. 4.

As shown in FIG. 4, in cases where the machine learning model 202 is a deep learning neural network, the machine learning model 202 can, in various aspects, comprise an input layer 402, a conditioning layer 404, a set of hidden layers 406, or an output layer 408.

In various instances, the input layer 402 can be any suitable type of neural network layer having any suitable trainable or fixed internal parameters. As a non-limiting example, the input layer 402 can be a dense layer having any suitable number of neurons, with each neuron having any suitable activation function, any suitable trainable weights, or any suitable trainable biases. As another non-limiting example, the input layer 402 can be a convolutional layer having any suitable number of trainable convolutional kernels, with each trainable convolutional kernel having any suitable format, size, or dimensionality.

In various cases, the set of hidden layers 406 can include any suitable number of hidden layers. In various aspects, a hidden layer can be any suitable type of neural network layer having any suitable trainable or fixed internal parameters. As a non-limiting example, a hidden layer can be a dense layer having any suitable number of neurons, with each neuron having any suitable activation function, any suitable trainable weights, or any suitable trainable biases. As another non-limiting example, a hidden layer can be a convolutional layer having any suitable number of trainable convolutional kernels, with each trainable convolutional kernel having any suitable format, size, or dimensionality. As even another non-limiting example, a hidden layer can be a batch normalization layer having any suitable number of trainable scale factors or trainable shift factors. As still other non-limiting examples, a hidden layer can be a pooling layer, a padding layer, a concatenation layer, or a non-linearity layer, any of which can have any suitable fixed (e.g., untrainable) internal parameters.

Likewise, in various instances, the output layer 408 can be any suitable type of neural network layer having any suitable trainable or fixed internal parameters. As a non-limiting example, the output layer 408 can be a dense layer having any suitable number of neurons, with each neuron having any suitable activation function, any suitable trainable weights, or any suitable trainable biases. As another non-limiting example, the output layer 408 can be a convolutional layer having any suitable number of trainable convolutional kernels, with each trainable convolutional kernel having any suitable format, size, or dimensionality. As even another non-limiting example, the output layer 408 can be a batch normalization layer having any suitable number of trainable scale factors or trainable shift factors. As still other non-limiting examples, the output layer 408 can be a pooling layer, a padding layer, a concatenation layer, or a non-linearity layer, any of which can have any suitable fixed (e.g., untrainable) internal parameters.

In various aspects, the conditioning layer 404 can be any suitable type of neural network conditioning layer having any suitable number of neurons or otherwise having any suitable trainable or fixed internal parameters. As a non-limiting example, the conditioning layer 404 can be a Feature-wise Linear Modulation (FiLM) layer.

In various instances, any suitable types or arrangements of interlayer connections (e.g., forward connections, skip connections, recurrent connections) can be implemented in the machine learning model 202 so as to couple the input layer 402, the conditioning layer 404, the set of hidden layers 406, or the output layer 408 together. As a non-limiting example, the input layer 402 can be coupled via any suitable forward connections to a first (e.g., most upstream) hidden layer in the set of hidden layers 406, or the input layer 402 can be coupled via any suitable skip connections to any other hidden layers in the set of hidden layers 406. As another non-limiting example, the conditioning layer 404 be coupled via any suitable forward connections to a first (e.g., most upstream) hidden layer in the set of hidden layers 406, or the conditioning layer 404 can be coupled via any suitable skip connections to any other hidden layers in the set of hidden layers 406. Although not explicitly shown in FIG. 4, the input layer 402 can be coupled via any suitable skip connections to the output layer 408. Likewise, although not explicitly shown in FIG. 4, the conditioning layer 404 can be coupled via any suitable skip connections to the output layer 408.

In various aspects, the execution component 114 can electronically feed the medical image 104 to the input layer 402, the execution component 114 can electronically feed the confidence indicator 106 to the conditioning layer 404, and both the medical image 104 and the confidence indicator 106 can complete a forward pass through the machine learning model 202. More specifically, the input layer 402 can generate various activation maps (not shown) based on the medical image 104. Likewise, the conditioning layer 404 can generate various other activation maps (not shown) based on the confidence indicator 106. In various instances, the activation maps from the input layer 402 and the other activation maps from the conditioning layer 404 can pass through the set of hidden layers 406 (e.g., according to whatever interlayer connections are implemented by the machine learning model 202). Accordingly, the set of hidden layers 406 can provide their own activation maps (not shown) to the output layer 408. In various cases, the output layer 408 can compute the regression task interval 204 based on the activation maps generated by the set of hidden layers 406 (or also based on activations from the input layer 402 or from the conditioning layer 404, if the input layer 402 or the conditioning layer 404 are coupled to the output layer 408 via skip connections).

In any case, the execution component 114 can electronically execute the machine learning model 202 on both the medical image 104 and the confidence indicator 106, thereby yielding the regression task interval 204 (e.g., thereby yielding the lower-bound regression task output 302 and the upper-bound regression task output 304).

Figure 5:
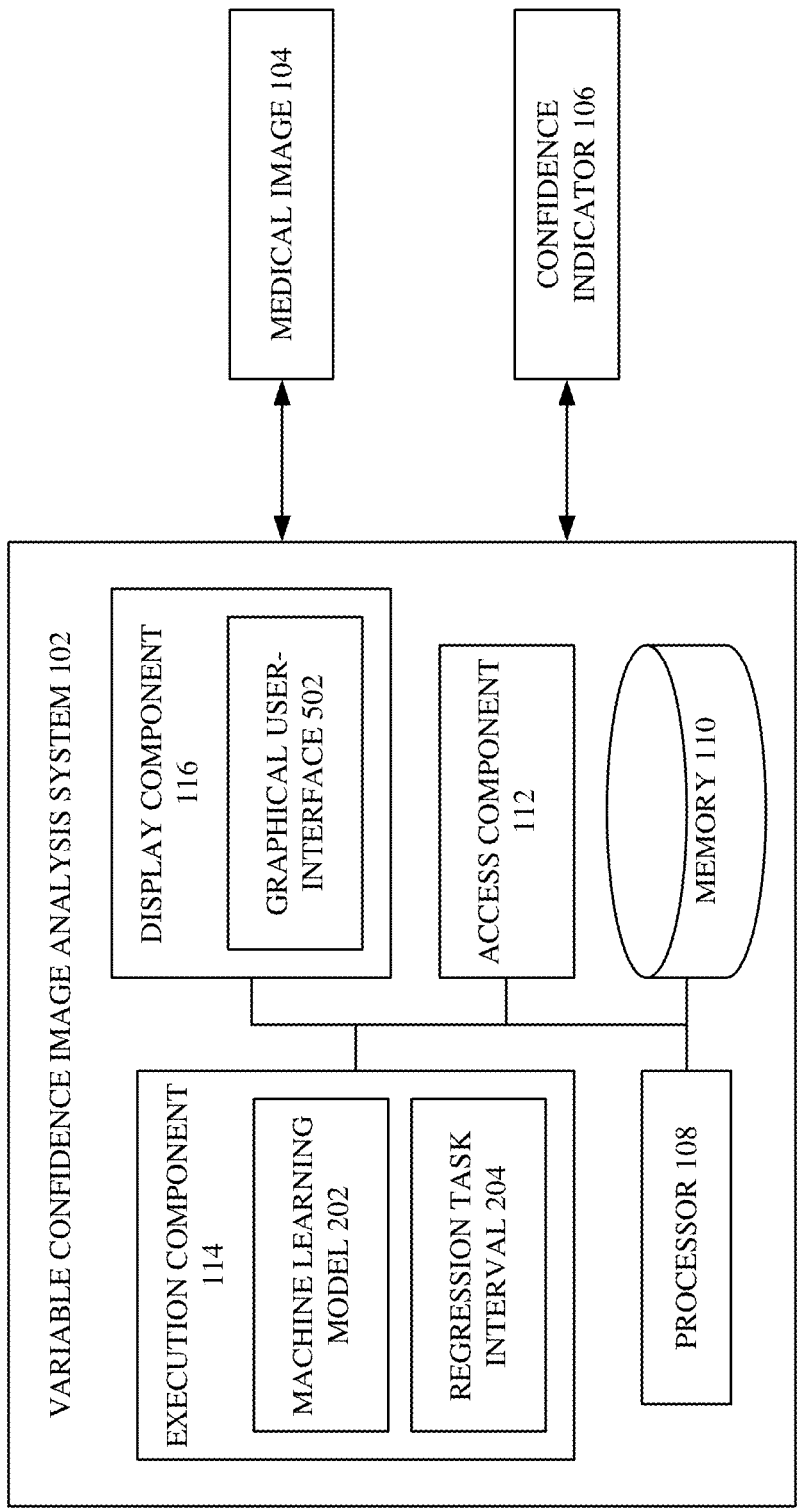
FIG. 5 illustrates a block diagram of an example, non-limiting system including a graphical user-interface that facilitates variable confidence machine learning in accordance with one or more embodiments described herein.

FIG. 5 illustrates a block diagram of an example, non-limiting system 500 including a graphical user-interface that can facilitate variable confidence machine learning in accordance with one or more embodiments described herein. As shown, the system 500 can, in various cases, comprise the same components as the system 200, and can further comprise a graphical user-interface 502.

In various embodiments, the display component 116 can electronically render, on any suitable electronic display (e.g., any suitable computer screen, any suitable computer monitor, or any suitable optical projection thereof), the graphical user-interface 502, based on the regression task interval 204. In various aspects, the graphical user-interface 502 can visually illustrate, depict, or otherwise show the lower-bound regression task output 302 and the upper-bound regression task output 304. As a non-limiting example, suppose that the regression task is image kernel transformation. In such case, the lower-bound regression task output 302 and the upper-bound regression task output 304 can both be kernel-transformed versions of the medical image 104, and the graphical user-interface 502 can visually picture both of such kernel-transformed versions of the medical image 104.

In various other aspects, the graphical user-interface 502 can visually illustrate, depict, or otherwise show a width of the regression task interval 204. In various instances, the display component 116 can accomplish this by computing a difference between the upper-bound regression task output 304 and the lower-bound regression task output 302. As a non-limiting example, suppose that the regression task is image kernel transformation, and suppose that the medical image 104 is an a-by-b pixel array, as mentioned above. In such case, the lower-bound regression task output 302 and the upper-bound regression task output 304 can both be kernel-transformed versions of the medical image 104. That is, the lower-bound regression task output 302 and the upper-bound regression task output 304 can each be an a-by-b pixel array. Accordingly, the display component 116 can, in various aspects, compute (e.g., via matrix subtraction) a new a-by-b pixel array that is equal to (or otherwise based on) an element-wise difference between the upper-bound regression task output 304 and the lower-bound regression task output 302. In various cases, the graphical user-interface 502 can visually picture such new a-by-b pixel array (e.g., can visually picture such element-wise difference).

In any case, a user, technician, or medical professional can visually inspect the graphical user-interface 502 when determining a diagnosis or prognosis for the medical patient whose anatomical structures are depicted in the medical image 104.

Although not explicitly shown in the figures, the machine learning model 202 can, in some cases, be configured to produce as output not just the regression task interval 204 but also an intermediate regression task output which the machine learning model 202 predicts is the true, correct, or accurate regression task result for the medical image 104. In other words, the regression task interval 204 can be considered as a confidence interval prediction made by the machine learning model 202, whereas the intermediate regression task output can be considered as a point-prediction made by the machine learning model 202. Accordingly, the intermediate regression task output can have the same format or dimensionality as the lower-bound regression task output 302 or as the upper-bound regression task output 304, and the intermediate regression task output can be numerically within the regression task interval 204 (e.g., can be greater than or equal to the lower-bound regression task output 302 and can be lesser than or equal to the upper-bound regression task output 304).

To help ensure that the regression task interval 204 (or the intermediate regression task output, as applicable) is accurate, the machine learning model 202 can first undergo training. Various non-limiting aspects of such training are described with respect to FIGS. 6-8.

Figure 6:
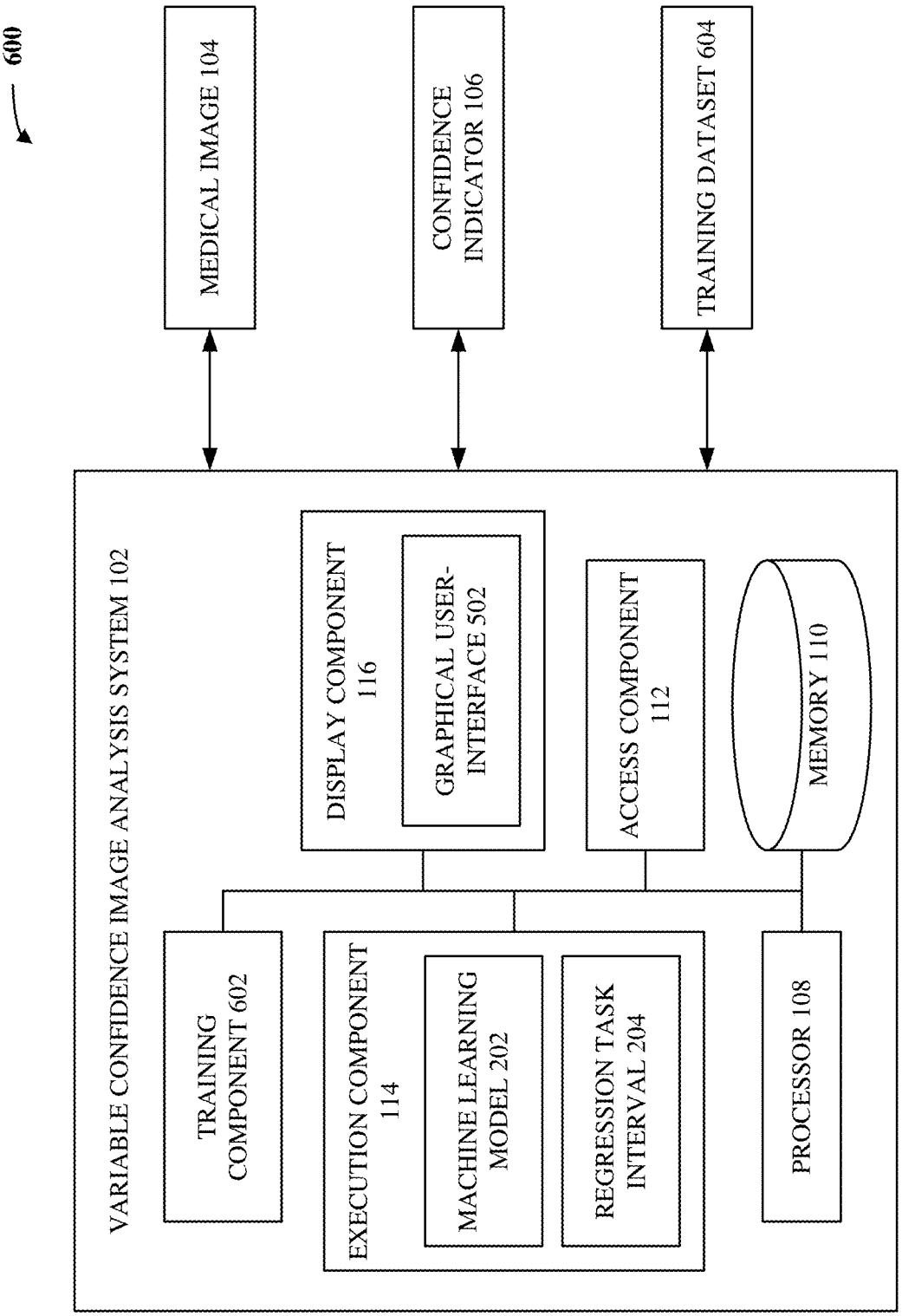
FIG. 6 illustrates a block diagram of an example, non-limiting system including a training component and a training dataset that facilitates variable confidence machine learning in accordance with one or more embodiments described herein.

FIG. 6 illustrates a block diagram of an example, non-limiting system 600 including a training component and a training dataset that can facilitate variable confidence machine learning in accordance with one or more embodiments described herein. As shown, the system 600 can, in some cases, comprise the same components as the system 500, and can further comprise a training component 602 or a training dataset 604.

In various embodiments, the access component 112 can electronically receive, retrieve, obtain, or otherwise access, from any suitable source, the training dataset 604. In various aspects, the training component 602 can train the machine learning model 202 based on the training dataset 604. In some cases, the training dataset 604 can be annotated, and so the training component 602 can perform supervised training on the machine learning model 202, as described with respect to FIGS. 7-8.

Figure 7:
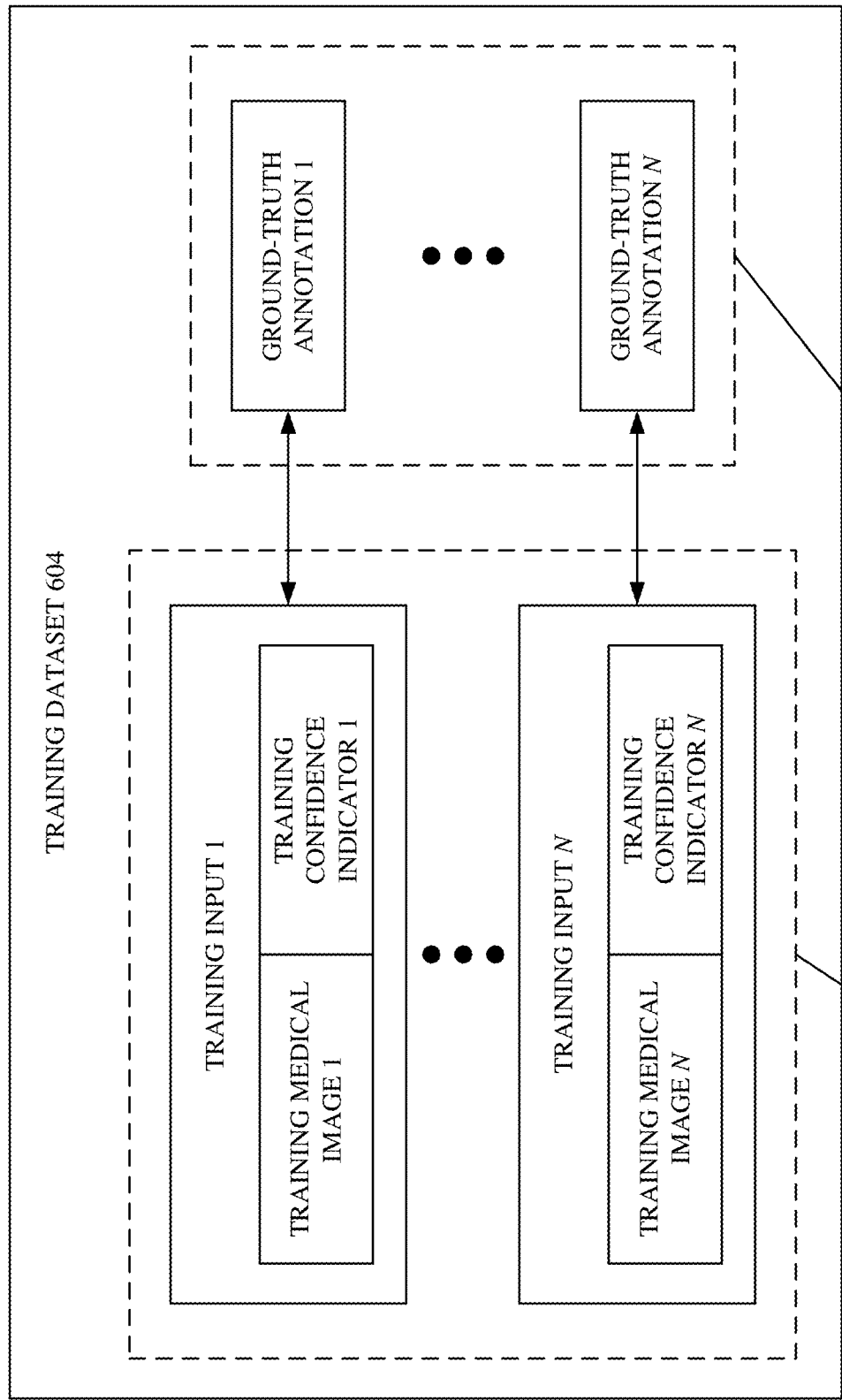
FIG. 7 illustrates an example, non-limiting block diagram of a training dataset in accordance with one or more embodiments described herein.

First, consider FIG. 7. FIG. 7 illustrates an example, non-limiting block diagram 700 of the training dataset 604 in accordance with one or more embodiments described herein. As shown in the non-limiting example of FIG. 7, the training dataset 604 can be an annotated training dataset. In particular, the training dataset 604 can comprise a set of training inputs 702 and a set of ground-truth annotations 704.

In various aspects, the set of training inputs 702 can include n inputs for any suitable positive integer n: a training input 1 to a training input n. In various instances, a training input can be any suitable piece of electronic data that includes both a training medical image and a training confidence indicator that corresponds to such training medical image.

For example, the training input 1 can include a training medical image 1 and a training confidence indicator 1. In various cases, the training medical image 1 can have the same format, size, or dimensionality as the medical image 104 (e.g., if the medical image 104 is an a-by-b pixel array, then the training medical image 1 can likewise be an a-by-b pixel array; if the medical image 104 is instead an a-by-b-by-c voxel array, then the training medical image 1 can be likewise be an a-by-b-by-c voxel array). Similarly, the training confidence indicator 1 can have the same size, format, or dimensionality as the confidence indicator 106 (e.g., if the confidence indicator 106 is a scalar whose value is greater than 0 and less than 1, then the training confidence indicator 1 can likewise be a scalar whose value is greater than 0 and less than 1). Accordingly, the training medical image 1 can be any suitable medical image on which the regression task is performable, and the training confidence indicator 1 can indicate or represent a confidence percentage or a confidence interval probability with which it is desired to perform the regression task on the training medical image 1.

As another example, the training input n can include a training medical image n and a training confidence indicator n. In various cases, the training medical image n can have the same format, size, or dimensionality as the medical image 104 (e.g., if the medical image 104 is an a-by-b pixel array, then the training medical image n can likewise be an a-by-b pixel array; if the medical image 104 is instead an a-by-b-by-c voxel array, then the training medical image n can be likewise be an a-by-b-by-c voxel array). Similarly, the training confidence indicator n can have the same size, format, or dimensionality as the confidence indicator 106 (e.g., if the confidence indicator 106 is a scalar whose value is greater than 0 and less than 1, then the training confidence indicator n can likewise be a scalar whose value is greater than 0 and less than 1). Accordingly, the training medical image n can be any suitable medical image on which the regression task is performable, and the training confidence indicator n can indicate or represent a confidence percentage or a confidence interval probability with which it is desired to perform the regression task on the training medical image n.

In various aspects, the set of ground-truth annotations 704 can respectively correspond (e.g., in one-to-one fashion) to the set of training inputs 702. Thus, since the set of training inputs 702 can have n inputs, the set of ground-truth annotations 704 can have n annotations: a ground-truth annotation 1 to a ground-truth annotation n. In various instances, each of the set of ground-truth annotations 704 can be any suitable electronic data that indicates or represents a regression task interval (or an intermediate regression task output, as applicable) that would be achieved if the regression task were correctly or accurately performed on a respective one of the set of training inputs 702.

Indeed, in various aspects, the ground-truth annotation 1 can correspond to the training input 1. Accordingly, the ground-truth annotation 1 can be considered as representing or otherwise conveying the correct or accurate regression task interval that is known or otherwise deemed to correspond to both the training medical image 1 and the training confidence indicator 1. As a non-limiting example, suppose that the regression task is image quality enhancement, and suppose that the training confidence indicator 1 has a value of q for any suitable real number $0<q<1$. In such case, the ground-truth annotation 1 can comprise a correct/accurate interval of quality-enhanced versions of the training medical image 1 (e.g., can comprise a correct/accurate lower-bound quality-enhanced version and a correct/accurate upper-bound quality-enhanced version), where such correct/accurate interval is known or deemed to have 100q % confidence. As another non-limiting example, suppose that the regression task is instead image denoising, but suppose that the training confidence indicator 1 still has a value of q for any suitable real number $0<q<1$. In such case, the ground-truth annotation 1 can comprise a correct/accurate interval of denoised versions of the training medical image 1 (e.g., can comprise a correct/accurate lower-bound denoised version and a correct/accurate upper-bound denoised version), where such correct/accurate interval is known or deemed to have 100q % confidence.

Similarly, in various aspects, the ground-truth annotation n can correspond to the training input n. Accordingly, the ground-truth annotation n can be considered as representing or otherwise conveying the correct or accurate regression task interval that is known or otherwise deemed to correspond to both the training medical image n and the training confidence indicator n. As a non-limiting example, suppose that the regression task is image kernel transformation, and suppose that the training confidence indicator n has a value of r for any suitable real number $0<r<1$. In such case, the ground-truth annotation n can comprise a correct/accurate interval of kernel-transformed versions of the training medical image n (e.g., can comprise a correct/accurate lower-bound kernel-transformed version and a correct/accurate upper-bound kernel-transformed version), where such correct/accurate interval is known or deemed to have 100r % confidence. As another non-limiting example, suppose that the regression task is image classification, but suppose that the training confidence indicator n still has a value of r for any suitable real number $0<r<1$. In such case, the ground-truth annotation n can comprise a correct/accurate interval of classification probabilities of the training medical image n (e.g., can comprise a correct/accurate lower-bound classification probability and a correct/accurate upper-bound classification probability), where such correct/accurate interval is known or deemed to have 100r % confidence.

Figure 8:
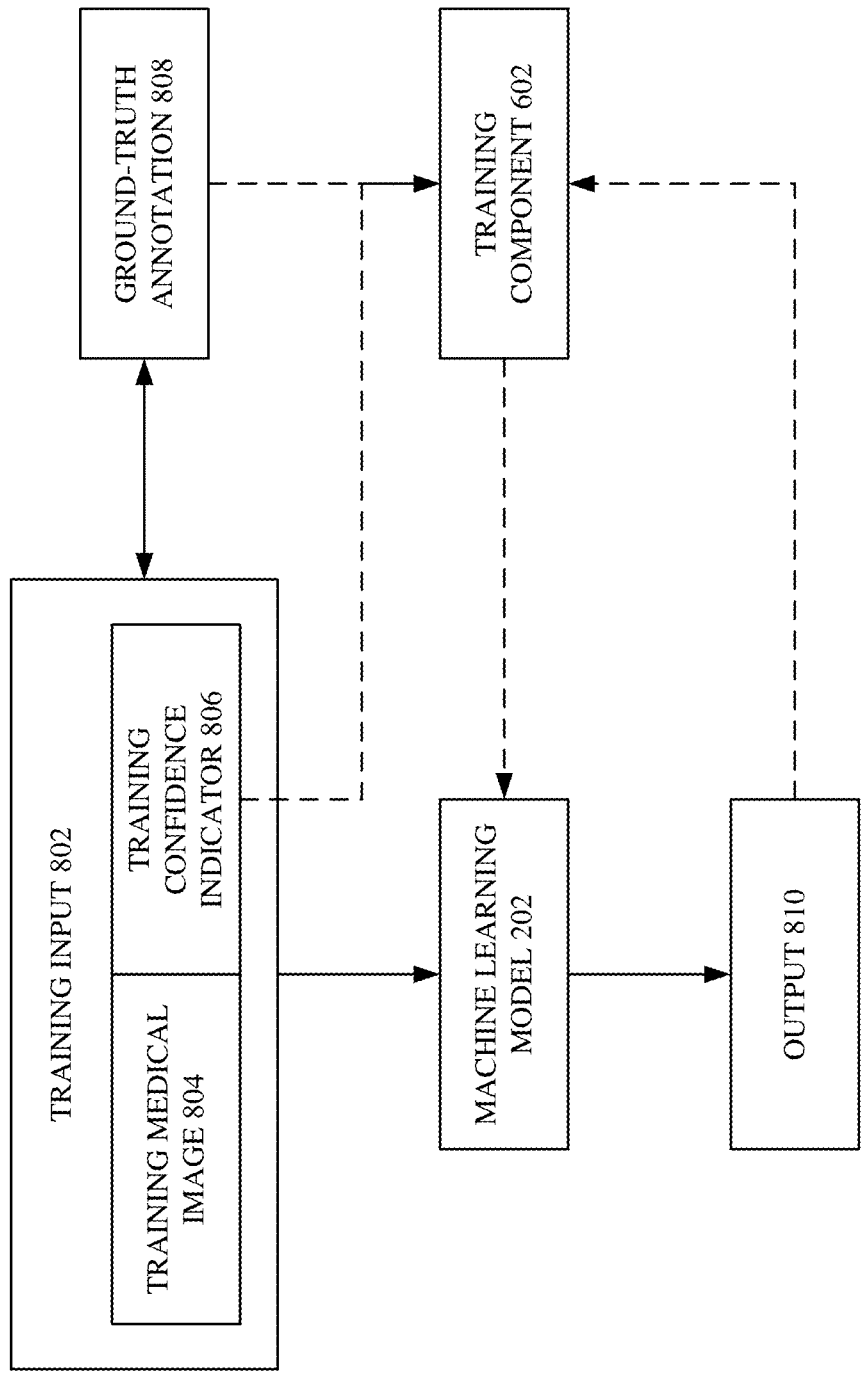
FIG. 8 illustrates an example, non-limiting block diagram showing how a machine learning model can be trained in accordance with one or more embodiments described herein.

Now, consider FIG. 8. As shown, FIG. 8 illustrates an example, non-limiting block diagram 800 showing how the machine learning model 202 can be trained on the training dataset 604 in accordance with one or more embodiments described herein.

In various aspects, the training component 602 can, prior to beginning training, initialize in any suitable fashion (e.g., random initialization) the trainable internal parameters (e.g., convolutional kernels, weight matrices, bias values) of the machine learning model 202.

In various aspects, the training component 602 can select from the training dataset 604 a training input 802 and a ground-truth annotation 808 corresponding to the training input 802. In various instances, as shown, the training input 802 can include a training medical image 804 and training confidence indicator 806. In various cases, the training component 602 can execute the machine learning model 202 on the training input 802, thereby causing the machine learning model 202 to produce an output 810. More specifically, in some cases, an input layer of the machine learning model 202 can receive the training medical image

804, a conditioning layer of the machine learning model 202 can receive the training confidence indicator 806, both the training medical image 804 and the training confidence indicator 806 can complete a forward pass through one or more hidden layers of the machine learning model 202, and an output layer of the machine learning model 202 can compute the output 810 based on activations provided by the one or more hidden layers.

Note that, in various cases, the dimensionality of the output 810 can be controlled or otherwise determined by the number or neurons in the output layer of the machine learning model 202 (e.g., a desired dimensionality of the output 810 can be achieved by adding neurons to or removing neurons from the output layer of the machine learning model 202).

In various aspects, the output 810 can be considered as the predicted or inferred regression task interval (e.g., predicted/inferred interval of quality-enhanced images, predicted/inferred interval of denoised images, predicted/inferred interval of kernel-transformed images, predicted/inferred interval of classification probabilities) that the machine learning model 202 believes should correspond to the training input 802. In contrast, the ground-truth annotation 808 can be considered as the correct or accurate regression task interval (e.g., correct/accurate interval of quality-enhanced images, correct/accurate interval of denoised images, correct/accurate interval of kernel-transformed images, correct/accurate interval of classification probabilities) that is known or deemed to correspond to the training input 802. Note that, if the machine learning model 202 has so far undergone no or little training, then the output 810 can be highly inaccurate (e.g., can be very different from the ground-truth annotation 808).

In various aspects, as shown, the training component 602 can compute an error or loss (e.g., MAE, MSE, cross-entropy) between the output 810 and the ground-truth annotation 808. In some cases, such error or loss can be based on the training confidence indicator 806. As a non-limiting example, the training component 602 can compute the error or loss using any suitable quantile regression loss function. In such case, the quantile regression loss function can take as arguments not just the ground-truth annotation 808 and the output 810, but also the training confidence indicator 806. In any case, the training component 602 can incrementally update, via backpropagation, the trainable internal parameters of the machine learning model 202, based on such computed error or loss.

In various cases, the training component 602 can repeat such execution and update procedure for each training input in the training dataset 604. This can ultimately cause the trainable internal parameters of the machine learning model 202 to become iteratively optimized for accurately performing the regression task based on inputted medical images and inputted confidence indicators. In various aspects, the training component 602 can implement any suitable training batch sizes, any suitable error/loss functions, or any suitable training termination criteria.

In various embodiments, when the machine learning model 202 has been trained as described herein, the machine learning model 202 can be considered as having learned how to adapt its analysis of any given medical image, based on the particular confidence indicator that accompanies that given medical image. In other words, the machine learning model 202 can be considered as having learned how differences in user-specified confidence indicators can influence outputted regression task intervals.

Although not explicitly shown in the figures, the variable confidence image analysis system 102 can, in various aspects, be operated on the medical image 104 a plurality of times, each time with a different or unique confidence indicator. In such instances, the variable confidence image analysis system 102 can generate or visually render a plurality of regression task intervals associated with the medical image 104, each of such plurality of regression task intervals respectively corresponding to a distinct or unique confidence indicator. In such cases, the variable confidence image analysis system 102 can be considered as illustrating or exploring how the regression task interval 204 of the medical image 104 can vary across different confidence indicator values.

Figure 9:
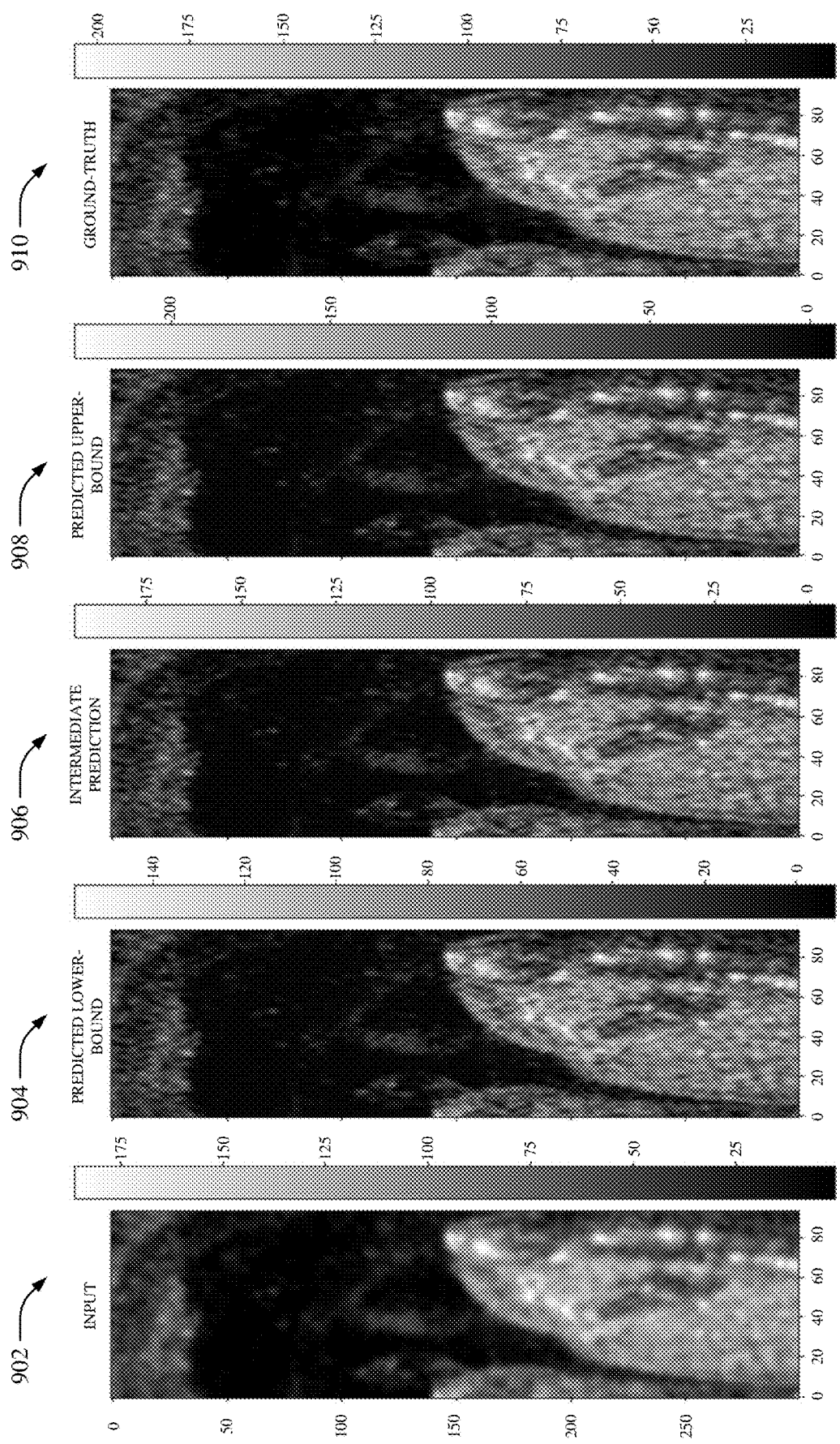
FIGS. 9-10 illustrate example, non-limiting experimental results in accordance with one or more embodiments described herein.
Figure 10:
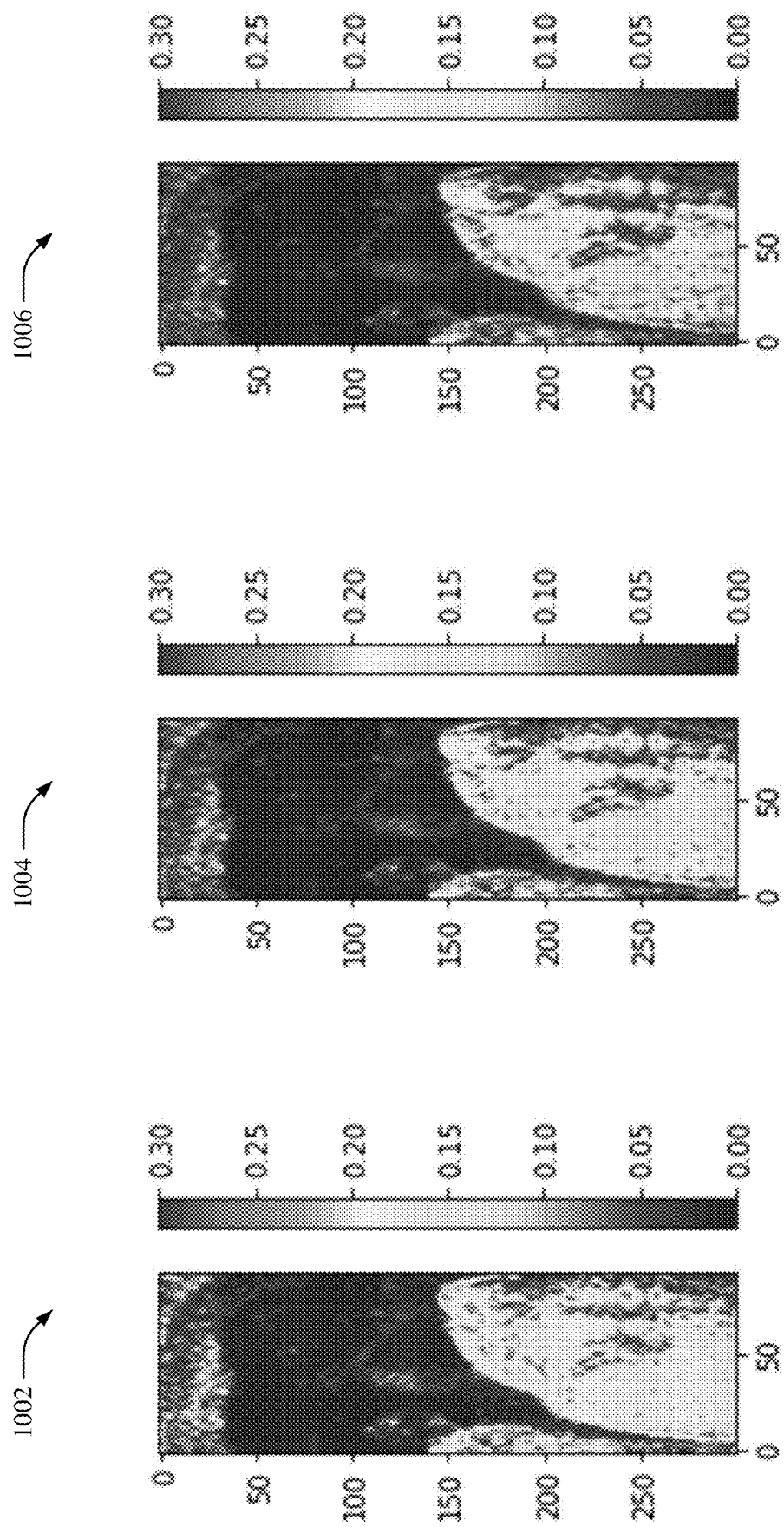

FIGS. 9-10 illustrate example, non-limiting experimental results in accordance with one or more embodiments described herein. In particular, the present inventors reduced to practice a non-limiting embodiment of the machine learning model 202, where such model was trained, as described herein, to perform variable confidence image quality enhancement on inputted ultrasound scanned images. In other words, the non-limiting model was configured to receive as input both an ultrasound scanned image and a confidence indicator, and to produce as output both a lower-bound quality-enhanced version and an upper-bound quality-enhanced version of the inputted ultrasound scanned image, based on the inputted confidence indicator. Furthermore, the non-limiting model was also configured to generate an intermediate quality-enhanced version of the inputted ultrasound scanned image, as a point-prediction between the outputted lower-bound and the outputted upper-bound. FIGS. 9-10 show various images pertaining to such non-limiting model.

First, consider FIG. 9. As shown, FIG. 9 illustrates a low-resolution ultrasound scanned image 902. The low-resolution ultrasound scanned image 902 was fed as input to the non-limiting model, after the non-limiting model had been trained as described herein. Additionally, the non-limiting model was fed as input a confidence indicator having a scalar value of 0.9. In response to being fed both the low-resolution ultrasound scanned image 902 and the confidence indicator of 0.9, the non-limiting model produced as output a lower-bound quality-enhanced predicted image 904 and an upper-bound quality-enhanced predicted image 908. Note that the lower-bound quality-enhanced predicted image 904 and the upper-bound quality-enhanced predicted image 908 can be considered as illustrating the same anatomical structures as each other, but with different pixel values as shown by the changing color legends of FIG. 9. Indeed, as shown by the color legends, the pixels of the lower-bound quality-enhanced predicted image 904 can have lower values (e.g., lower Hounsfield unit values) than corresponding pixels of the upper-bound quality-enhanced predicted image 908. Accordingly, the lower-bound quality-enhanced predicted image 904 and the upper-bound quality-enhanced predicted image 908 can be considered as bookends of an interval or range of quality-enhanced versions of the low-resolution ultrasound scanned image 902.

Furthermore, the non-limiting model also produced as output an intermediate quality-enhanced predicted image 906. As shown by the color legends of FIG. 9, the pixel values of the intermediate quality-enhanced predicted image 906 can be considered as being numerically greater than respective pixels of the lower-bound quality-enhanced predicted image 904 and as being numerically lesser than respective pixel values of the upper-bound quality-enhanced predicted image 908. In other words, the intermediate quality-enhanced predicted image 906 can be considered as a point-prediction selected from the predicted interval of quality-enhanced versions of the low-resolution ultrasound scanned image 902.

Lastly, as shown, FIG. 9 illustrates a ground-truth quality-enhanced image 910 that is known or deemed to correspond to the low-resolution ultrasound scanned image 902. As can be seen, the ground-truth quality-enhanced image 910 can be considered as being numerically within the interval defined by the lower-bound quality-enhanced predicted image 904 and by the upper-bound quality-enhanced predicted image 908. Furthermore, as can be seen, the ground-truth quality-enhanced image 910 can be considered as closely matching the intermediate quality-enhanced predicted image 906.

Now, consider FIG. 10. As shown, FIG. 10 illustrates an image 1002. The image 1002 was obtained by computing an element-wise difference (e.g., via matrix subtraction) between the upper-bound quality-enhanced predicted image 908 and the lower-bound quality-enhanced predicted image 904. In other words, the lower-bound quality-enhanced predicted image 904 was subtracted from the upper-bound quality-enhanced predicted image 908, and the result was the image 1002. Accordingly, the image 1002 can be considered as illustrating the pixel-wise differences between the upper-bound quality-enhanced predicted image 908 and the lower-bound quality-enhanced predicted image 904. Note that, if any given pixel of the low-resolution ultrasound scanned image 902 has a pixel-wise difference in the image 1002 that is small (e.g., close to 0.00 in the non-limiting example of FIG. 10), this can mean that the predicted interval of quality-enhanced values for such given pixel is not wide or otherwise has low variability. In contrast, if any given pixel of the low-resolution ultrasound scanned image 902 has a pixel-wise difference in the image 1002 that is large (e.g., close to 0.30 in the non-limiting example of FIG. 10), this can mean that the predicted interval of quality-enhanced values for such given pixel is wide or otherwise has high variability. Thus, the image 1002 can be considered as visually conveying the pixel-wise variabilities evident in the predicted interval of quality-enhanced versions of the low-resolution ultrasound scanned image 902 according to a confidence indicator of 0.9.

As shown, FIG. 10 also illustrates an image 1004. The image 1004 was obtained as follows: the low-resolution ultrasound scanned image 902 and a confidence indicator of 0.8 (not 0.9) were fed as input to the non-limiting model; the non-limiting model produced as output a lower-bound quality-enhanced predicted image and an upper-bound quality-enhanced predicted image; and the image 1004 was computed as the element-wise difference between such lower-bound quality-enhanced predicted image and such upper-bound quality-enhanced predicted image. In other words, the image 1004 was created in the same fashion as the image 1002, with the only distinction being the inputted confidence indicator; 0.9 (e.g., 90% confidence) was used to create the image 1002, whereas 0.8 (e.g., 80% confidence) was used to create the image 1004.

As also shown, FIG. 10 further illustrates an image 1006. The image 1006 was obtained as follows: the low-resolution ultrasound scanned image 902 and a confidence indicator of 0.7 (not 0.9 and not 0.8) were fed as input to the non-limiting model; the non-limiting model produced as output a lower-bound quality-enhanced predicted image and an upper-bound quality-enhanced predicted image; and the image 1006 was computed as the element-wise difference between such lower-bound quality-enhanced predicted image and such upper-bound quality-enhanced predicted image. In other words, the image 1006 was created in the same fashion as the image 1002 and the image 1004, with the only distinction being the inputted confidence indicator; 0.9 (e.g., 90% confidence) was used to create the image 1002 and 0.8 (e.g., 80% confidence) was used to create the image 1004, whereas 0.7 (e.g., 70% confidence) was used to create the image 1006.

As can be seen in FIG. 10, the interval of quality-enhanced versions of the low-resolution ultrasound scanned image 902 can change as the inputted confidence indicator changes. These results help to show that the non-limiting model that was reduced to practice learned how to correlate variations in inputted confidence indicator to variations in outputted quality-enhanced intervals. In other words, the non-limiting model can be applied across different confidence quantiles (e.g., is not limited to a single confidence quantile).

Figure 11:
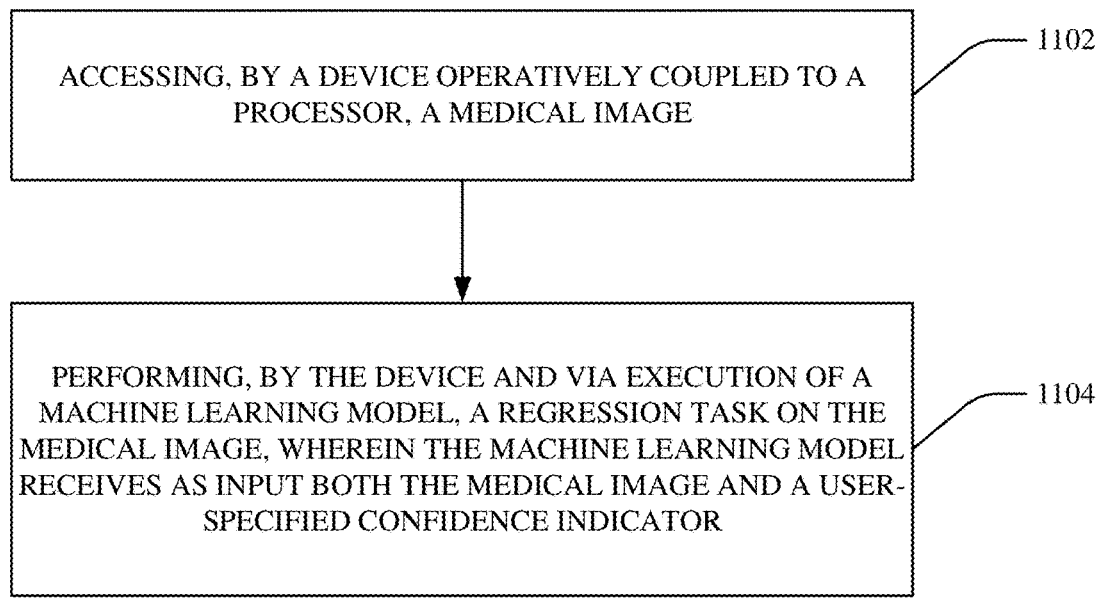
FIG. 11 illustrates a flow diagram of an example, non-limiting computer-implemented method that facilitates variable confidence machine learning in accordance with one or more embodiments described herein.

FIG. 11 illustrates a flow diagram of an example, non-limiting computer-implemented method 1100 that can facilitate variable confidence machine learning in accordance with one or more embodiments described herein. In various cases, the variable confidence image analysis system 102 can facilitate the computer-implemented method 1100.

In various embodiments, act 1102 can include accessing, by a device (e.g., via 112) operatively coupled to a processor (e.g., 108), a medical image (e.g., 104).

In various aspects, act 1104 can include performing, by the device (e.g., via 114) and via execution of a machine learning model (e.g., 202), a regression task on the medical image, wherein the machine learning model can receive as input both the medical image and a user-specified confidence indicator (e.g., 106).

Although not explicitly shown in FIG. 11, the machine learning model can produce as output: a lower-bound regression task result (e.g., 302) based on both the medical image and the user-specified confidence indicator; and an upper-bound regression task result (e.g., 304) based on both the medical image and the user-specified confidence indicator.

Although not explicitly shown in FIG. 11, the computer-implemented method 1100 can comprise: rendering, by the device (e.g., via 116), the lower-bound regression task result and the upper-bound regression task result on a graphical user-interface (e.g., 502).

Although not explicitly shown in FIG. 11, the computer-implemented method 1100 can comprise: rendering, by the device (e.g., via 116), a difference between the lower-bound regression task result and the upper-bound regression task result on a graphical user-interface (e.g., 502).

Although not explicitly shown in FIG. 11, the machine learning model can be a neural network, and the neural network can include a conditioning layer (e.g., 404) that receives the user-specified confidence indicator. In various cases, the conditioning layer can be a feature-wise linear modulation layer.

Although not explicitly shown in FIG. 11, the computer-implemented method 1100 can comprise: training, by the device (e.g., via 602), the machine learning model on a set of training inputs (e.g., 702), wherein a training input can comprise a training medical image paired with a training user-specified confidence indicator.

Various embodiments described herein can be considered as a computerized tool for facilitating variable confidence machine learning. A machine learning model implemented as described herein can be configured or trained to receive as explicit input features not just a medical image, but also a user-specified confidence indicator representing a confidence percentage according to which it is desired to perform a regression task on the medical image. Such a machine learning model can be considered as having learned how changes in such inputted confidence indicator can influence regression task outputs. Accordingly, when various teachings described herein are implemented, the machine learning model can be applied across various different confidence indicators (e.g., across various different confidence interval percentages) without having to undergo retraining and without having to separately train a unique machine learning model for each distinct confidence quantile that is desired, unlike existing techniques that utilize fixed confidence qualities. Therefore, various embodiments described herein certainly constitute a concrete and tangible technical improvement in the field of machine learning.

Although the herein disclosure mainly describes various embodiments as applying to medical images, this is a mere non-limiting example. In various aspects, the herein-described teachings can be extrapolated to any suitable types of imaging data (e.g., can be not limited only to imaging data in the medical/clinical context). Indeed, in some instances, the herein-described teachings can be extrapolated to any suitable types of non-imaging data (e.g., regardless of the type of data that a machine learning model is configured to operate on, such machine learning model can be configured to receive as input a user-specified confidence indicator as described herein).

In various instances, machine learning algorithms or models can be implemented in any suitable way to facilitate any suitable aspects described herein. To facilitate some of the above-described machine learning aspects of various embodiments, consider the following discussion of artificial intelligence (AI). Various embodiments described herein can employ artificial intelligence to facilitate automating one or more features or functionalities. The components can employ various AI-based schemes for carrying out various embodiments/examples disclosed herein. In order to provide for or aid in the numerous determinations (e.g., determine, ascertain, infer, calculate, predict, prognose, estimate, derive, forecast, detect, compute) described herein, components described herein can examine the entirety or a subset of the data to which it is granted access and can provide for reasoning about or determine states of the system or environment from a set of observations as captured via events or data. Determinations can be employed to identify a specific context or action, or can generate a probability distribution over states, for example. The determinations can be probabilistic; that is, the computation of a probability distribution over states of interest based on a consideration of data and events. Determinations can also refer to techniques employed for composing higher-level events from a set of events or data.

Such determinations can result in the construction of new events or actions from a set of observed events or stored event data, whether or not the events are correlated in close temporal proximity, and whether the events and data come from one or several event and data sources. Components disclosed herein can employ various classification (explicitly trained (e.g., via training data) as well as implicitly trained (e.g., via observing behavior, preferences, historical information, receiving extrinsic information, and so on)) schemes or systems (e.g., support vector machines, neural networks, expert systems, Bayesian belief networks, fuzzy logic, data fusion engines, and so on) in connection with performing automatic or determined action in connection with the claimed subject matter. Thus, classification schemes or systems can be used to automatically learn and perform a number of functions, actions, or determinations.

A classifier can map an input attribute vector, $z=(z_1, z_2, z_3, z_4, z_n)$, to a confidence that the input belongs to a class, as by $f(z)=confidence(class)$. Such classification can employ a probabilistic or statistical-based analysis (e.g., factoring into the analysis utilities and costs) to determinate an action to be automatically performed. A support vector machine (SVM) can be an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, or probabilistic classification models providing different patterns of independence, any of which can be employed. Classification as used herein also is inclusive of statistical regression that is utilized to develop models of priority.

The herein disclosure describes non-limiting examples. For ease of description or explanation, various portions of the herein disclosure utilize the term "each," "every," or "all" when discussing various examples. Such usages of the term "each," "every," or "all" are non-limiting. In other words, when the herein disclosure provides a description that is applied to "each," "every," or "all" of some particular object or component, it should be understood that this is a non-limiting example, and it should be further understood that, in various other examples, it can be the case that such description applies to fewer than "each," "every," or "all" of that particular object or component.

Figure 12:
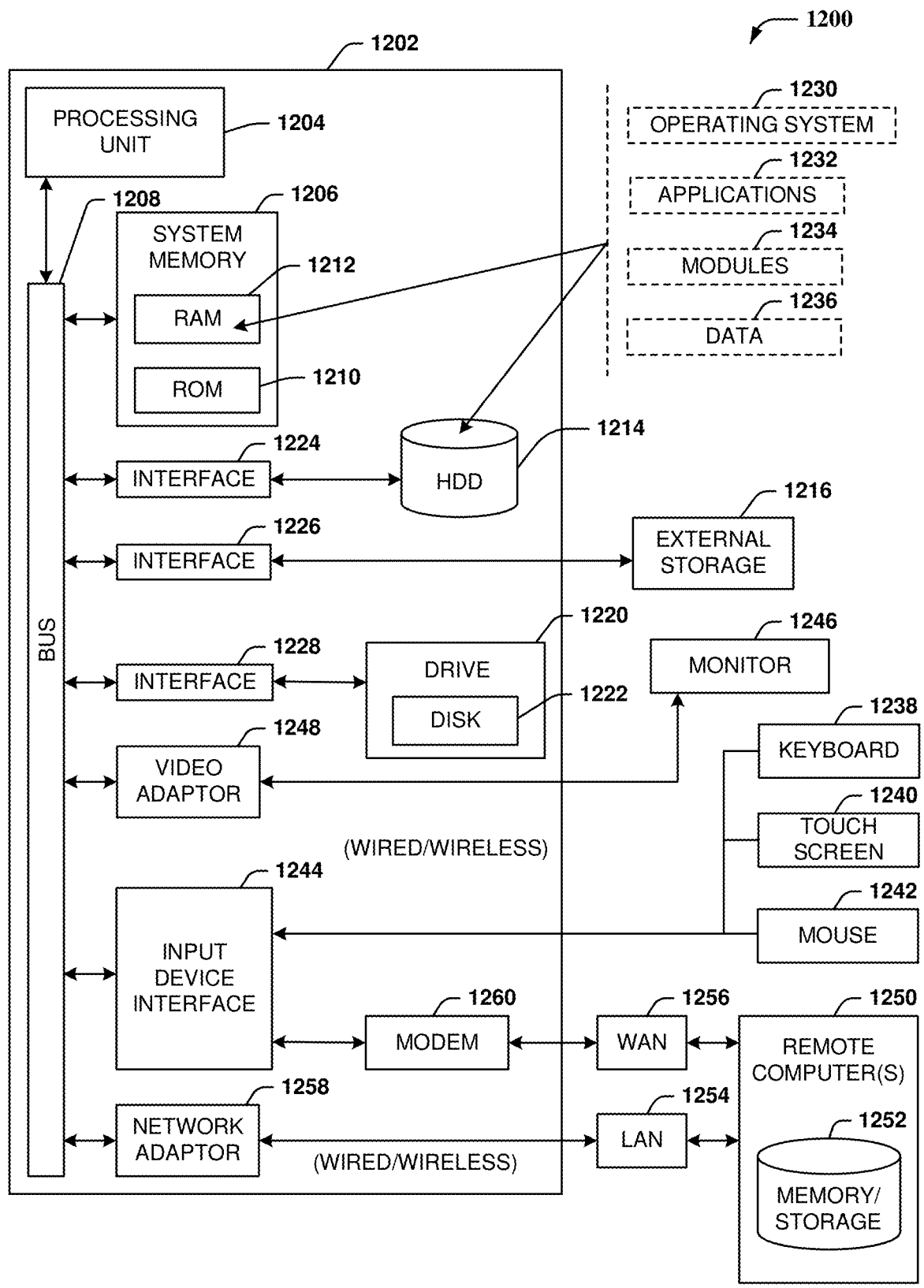
FIG. 12 illustrates a block diagram of an example, non-limiting operating environment in which one or more embodiments described herein can be facilitated.

In order to provide additional context for various embodiments described herein, FIG. 12 and the following discussion are intended to provide a brief, general description of a suitable computing environment 1200 in which the various embodiments of the embodiment described herein can be implemented. While the embodiments have been described above in the general context of computer-executable instructions that can run on one or more computers, those skilled in the art will recognize that the embodiments can be also implemented in combination with other program modules or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multi-processor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 12, the example environment 1200 for implementing various embodiments of the aspects described herein includes a computer 1202, the computer 1202 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi-processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes ROM 1210 and RAM 1212. A basic input/output system (BIOS) can be stored in a non-volatile memory such as ROM, erasable programmable read only memory (EPROM), EEPROM, which BIOS contains the basic routines that help to transfer information between elements within the computer 1202, such as during startup. The RAM 1212 can also include a high-speed RAM such as static RAM for caching data.

The computer 1202 further includes an internal hard disk drive (HDD) 1214 (e.g., EIDE, SATA), one or more external storage devices 1216 (e.g., a magnetic floppy disk drive (FDD) 1216, a memory stick or flash drive reader, a memory card reader, etc.) and a drive 1220, e.g., such as a solid state drive, an optical disk drive, which can read or write from a disk 1222, such as a CD-ROM disc, a DVD, a BD, etc. Alternatively, where a solid state drive is involved, disk 1222 would not be included, unless separate. While the internal HDD 1214 is illustrated as located within the computer 1202, the internal HDD 1214 can also be configured for external use in a suitable chassis (not shown). Additionally, while not shown in environment 1200, a solid state drive (SSD) could be used in addition to, or in place of, an HDD 1214. The HDD 1214, external storage device(s) 1216 and drive 1220 can be connected to the system bus 1208 by an HDD interface 1224, an external storage interface 1226 and a drive interface 1228, respectively. The interface 1224 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1202, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1212, including an operating system 1230, one or more application programs 1232, other program modules 1234 and program data 1236. All or portions of the operating system, applications, modules, or data can also be cached in the RAM 1212. The systems and methods described herein can be implemented utilizing various commercially available operating systems or combinations of operating systems.

Computer 1202 can optionally comprise emulation technologies. For example, a hypervisor (not shown) or other intermediary can emulate a hardware environment for operating system 1230, and the emulated hardware can optionally be different from the hardware illustrated in FIG. 12. In such an embodiment, operating system 1230 can comprise one virtual machine (VM) of multiple VMs hosted at computer 1202. Furthermore, operating system 1230 can provide runtime environments, such as the Java runtime environment or the .NET framework, for applications 1232. Runtime environments are consistent execution environments that allow applications 1232 to run on any operating system that includes the runtime environment. Similarly, operating system 1230 can support containers, and applications 1232 can be in the form of containers, which are lightweight, standalone, executable packages of software that include, e.g., code, runtime, system tools, system libraries and settings for an application.

Further, computer 1202 can be enable with a security module, such as a trusted processing module (TPM). For instance with a TPM, boot components hash next in time boot components, and wait for a match of results to secured values, before loading a next boot component. This process can take place at any layer in the code execution stack of computer 1202, e.g., applied at the application execution level or at the operating system (OS) kernel level, thereby enabling security at any level of code execution.

A user can enter commands and information into the computer 1202 through one or more wired/wireless input devices, e.g., a keyboard 1238, a touch screen 1240, and a pointing device, such as a mouse 1242. Other input devices (not shown) can include a microphone, an infrared (IR) remote control, a radio frequency (RF) remote control, or other remote control, a joystick, a virtual reality controller or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1204 through an input device interface 1244 that can be coupled to the system bus 1208, but can be connected by other interfaces, such as a parallel port, an IEEE 1394 serial port, a game port, a USB port, an IR interface, a BLUETOOTH® interface, etc.

A monitor 1246 or other type of display device can be also connected to the system bus 1208 via an interface, such as a video adapter 1248. In addition to the monitor 1246, a computer typically includes other peripheral output devices (not shown), such as speakers, printers, etc.

The computer 1202 can operate in a networked environment using logical connections via wired or wireless communications to one or more remote computers, such as a remote computer(s) 1250. The remote computer(s) 1250 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1252 is illustrated. The logical connections depicted include wired/wireless connectivity to a local area network (LAN) 1254 or larger networks, e.g., a wide area network (WAN) 1256. Such LAN and WAN networking environments are commonplace in offices and companies, and facilitate enterprise-wide computer networks, such as intranets, all of which can connect to a global communications network, e.g., the Internet.

When used in a LAN networking environment, the computer 1202 can be connected to the local network 1254 through a wired or wireless communication network interface or adapter 1258. The adapter 1258 can facilitate wired or wireless communication to the LAN 1254, which can also include a wireless access point (AP) disposed thereon for communicating with the adapter 1258 in a wireless mode.

When used in a WAN networking environment, the computer 1202 can include a modem 1260 or can be connected to a communications server on the WAN 1256 via other means for establishing communications over the WAN 1256, such as by way of the Internet. The modem 1260, which can be internal or external and a wired or wireless device, can be connected to the system bus 1208 via the input device interface 1244. In a networked environment, program modules depicted relative to the computer 1202 or portions thereof, can be stored in the remote memory/storage device 1252. It will be appreciated that the network connections shown are example and other means of establishing a communications link between the computers can be used.

When used in either a LAN or WAN networking environment, the computer 1202 can access cloud storage systems or other network-based storage systems in addition to, or in place of, external storage devices 1216 as described above, such as but not limited to a network virtual machine providing one or more aspects of storage or processing of information. Generally, a connection between the computer 1202 and a cloud storage system can be established over a LAN 1254 or WAN 1256 e.g., by the adapter 1258 or modem 1260, respectively. Upon connecting the computer 1202 to an associated cloud storage system, the external storage interface 1226 can, with the aid of the adapter 1258 or modem 1260, manage storage provided by the cloud storage system as it would other types of external storage. For instance, the external storage interface 1226 can be configured to provide access to cloud storage sources as if those sources were physically connected to the computer 1202.

The computer 1202 can be operable to communicate with any wireless devices or entities operatively disposed in wireless communication, e.g., a printer, scanner, desktop or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 13:
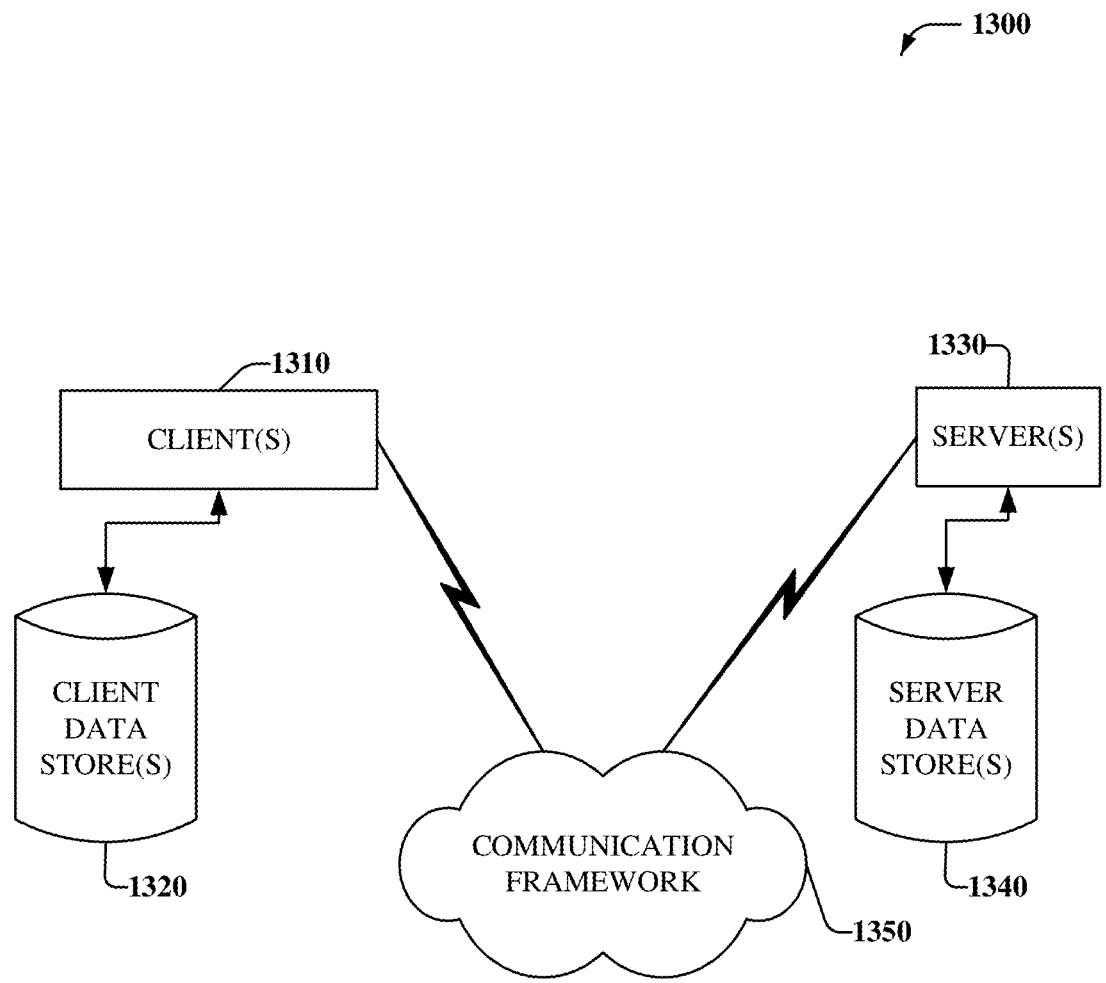
FIG. 13 illustrates an example networking environment operable to execute various implementations described herein.

FIG. 13 is a schematic block diagram of a sample computing environment 1300 with which the disclosed subject matter can interact. The sample computing environment 1300 includes one or more client(s) 1310. The client(s) 1310 can be hardware or software (e.g., threads, processes, computing devices). The sample computing environment 1300 also includes one or more server(s) 1330. The server(s) 1330 can also be hardware or software (e.g., threads, processes, computing devices). The servers 1330 can house threads to perform transformations by employing one or more embodiments as described herein, for example. One possible communication between a client 1310 and a server 1330 can be in the form of a data packet adapted to be transmitted between two or more computer processes. The sample computing environment 1300 includes a communication framework 1350 that can be employed to facilitate communications between the client(s) 1310 and the server(s) 1330. The client(s) 1310 are operably connected to one or more client data store(s) 1320 that can be employed to store information local to the client(s) 1310. Similarly, the server(s) 1330 are operably connected to one or more server data store(s) 1340 that can be employed to store information local to the servers 1330.

The present invention may be a system, a method, an apparatus or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network or a wireless network. The network can comprise copper transmission cables, optical transmission fibers, wireless transmission, routers, firewalls, switches, gateway computers or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations or block diagrams of methods, apparatus (systems), and computer program products according to embodiments of the invention. It will be understood that each block of the flowchart illustrations or block diagrams, and combinations of blocks in the flowchart illustrations or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart or block diagram block or blocks. These computer readable program instructions can also be stored in a computer readable storage medium that can direct a computer, a programmable data processing apparatus, or other devices to function in a particular manner, such that the computer readable storage medium having instructions stored therein comprises an article of manufacture including instructions which implement aspects of the function/act specified in the flowchart or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer or computers, those skilled in the art will recognize that this disclosure also can or can be implemented in combination with other program modules. Generally, program modules include routines, programs, components, data structures, etc. that perform particular tasks or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, or a computer. By way of illustration, both an application running on a server and the server can be a component. One or more components can reside within a process or thread of execution and a component can be localized on one computer or distributed between two or more computers. In another example, respective components can execute from various computer readable media having various data structures stored thereon. The components can communicate via local or remote processes such as in accordance with a signal having one or more data packets (e.g., data from one component interacting with another component in a local system, distributed system, or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. As used herein, the term "and/or" is intended to have the same meaning as "or." Moreover, articles "a" and "an" as used in the subject specification and annexed drawings should generally be construed to mean "one or more" unless specified otherwise or clear from context to be directed to a singular form. As used herein, the terms "example" or "exemplary" are utilized to mean serving as an example, instance, or illustration. For the avoidance of doubt, the subject matter disclosed herein is not limited by such examples. In addition, any aspect or design described herein as an "example" or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," "data storage," "database," and substantially any other information storage component relevant to operation and functionality of a component are utilized to refer to "memory components," entities embodied in a "memory," or components comprising a memory. It is to be appreciated that memory or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
a memory configured to store computer-executable components; and
a processor that executes at least one of the computer-executable components that:
trains, using a set of training data, a machine learning model to perform a regression task on medical images, wherein the set of training data comprises tuples,
wherein each tuple comprises:
a respective training medical image, wherein the set of training data comprises a plurality of different training medical images,
a respective training confidence quantile value for the respective training medical image, wherein the set of training data comprises a plurality of different training confidence quantile values, and
a respective ground truth annotation;
wherein the machine learning model comprises:
a set of hidden layers,
an input layer coupled to the set of hidden layers, wherein the input layer provides first inputs to the set of hidden layers,
a conditioning layer coupled to the set of hidden layers, wherein the input layer is parallel to the conditioning layer, and wherein the conditioning layer provides second inputs to the set of hidden layers, and
an output layer that receives outputs from the set of hidden layers; and
wherein the training comprises iteratively performing until a defined criterion is satisfied:
selecting a tuple from the set of training data that has not been employed for the training,
providing the respective training medical image of the tuple to the input layer,
providing the respective training confidence quantile value of the tuple to the conditioning layer,
performing, via execution of the machine learning model, the regression task on the respective training medical image using the respective training confidence quantile value, and
updating the machine learning model based on loss function associated with a result of performing the regression task and the respective ground truth annotation of the tuple;
accesses a medical image and a user-specified confidence quantile value; and
performs, via execution of the machine learning model, the regression task on the medical image with the user-specified confidence quantile value.

2. The system of claim 1, wherein a result of performing the regression task on the medical image comprises:
a lower-bound regression task result based on both the medical image and the user-specified confidence quantile value; and
an upper-bound regression task result based on both the medical image and the user-specified confidence quantile value.

3. The system of claim 2, wherein the at least one of the computer-executable components further:
renders the lower-bound regression task result and the upper-bound regression task result on a graphical user-interface.

4. The system of claim 2, wherein the at least one of the computer-executable components further:
renders a difference between the lower-bound regression task result and the upper-bound regression task result on a graphical user-interface.

5. The system of claim 1, wherein the machine learning model is a neural network.

6. The system of claim 1, wherein the conditioning layer is a feature-wise linear modulation layer.

7. The system of claim 1, wherein the at least one of the computer-executable components further:
performs, via execution of the machine learning model, the regression task on the medical image again using a different user-specified confidence indicator.

8. A computer-implemented method, comprising:
training, by a system comprising a processor, using a set of training data, a machine learning model to perform a regression task on medical images, wherein the set of training data comprises tuples,
wherein each tuple comprises:
a respective training medical image, wherein the set of training data comprises a plurality of different training medical images,
a respective training confidence quantile value for the respective training medical image, wherein the set of training data comprises a plurality of different training confidence quantile values, and
a respective ground truth annotation;
wherein the machine learning model comprises:
a set of hidden layers,
an input layer coupled to the set of hidden layers, wherein the input layer provides first inputs to the set of hidden layers,
a conditioning layer coupled to the set of hidden layers, wherein the input layer is parallel to the conditioning layer, and wherein the conditioning layer provides second inputs to the set of hidden layers, and
an output layer that receives outputs from the set of hidden layers; and
wherein the training comprises iteratively performing until a defined criterion is satisfied:
selecting a tuple from the set of training data that has not been employed for the training,
providing the respective training medical image of the tuple to the input layer,
providing the respective training confidence quantile value of the tuple to the conditioning layer,
performing, via execution of the machine learning model, the regression task on the respective training medical image using the respective training confidence quantile value, and
updating the machine learning model based on loss function associated with a result of performing the regression task and the respective ground truth annotation of the tuple;
accessing, by the system, a medical image and a user-specified confidence quantile value; and
performing, by the system, via execution of the machine learning model, the regression task on the medical image with the user-specified confidence quantile value.

9. The computer-implemented method of claim 8, wherein a result of performing the regression task on the medical image comprises:

a lower-bound regression task result based on both the medical image and the user-specified confidence quantile value; and an upper-bound regression task result based on both the medical image and the user-specified confidence quantile value.

10. The computer-implemented method of claim 9, further comprising:

rendering, by the system, the lower-bound regression task result and the upper-bound regression task result on a graphical user-interface.

11. The computer-implemented method of claim 9, further comprising:

rendering, by the system, a difference between the lower-bound regression task result and the upper-bound regression task result on a graphical user-interface.

12. The computer-implemented method of claim 8, wherein the machine learning model is a neural network.

13. The computer-implemented method of claim 8, wherein the conditioning layer is a feature-wise linear modulation layer.

14. The computer-implemented method of claim 8, further comprising:

performing, by the system, via execution of the machine learning model, the regression task on the medical image again using a different user-specified confidence indicator.

15. A computer program product for facilitating variable confidence machine learning, the computer program product comprising a non-transitory computer-readable memory having program instructions embodied therewith, the program instructions executable by a processor to cause the processor to:

train, using a set of training data, a machine learning model to perform a regression task on medical images, wherein the set of training data comprises tuples, wherein each tuple comprises:
a respective training medical image, wherein the set of training data comprises a plurality of different training medical images,
a respective training confidence quantile value for the respective training medical image, wherein the set of training data comprises a plurality of different training confidence quantile values, and
a respective ground truth annotation;
wherein the machine learning model comprises:
a set of hidden layers,
an input layer coupled to the set of hidden layers, wherein the input layer provides first inputs to the set of hidden layers,
a conditioning layer coupled to the set of hidden layers, wherein the input layer is parallel to the conditioning layer, and wherein the conditioning layer provides second inputs to the set of hidden layers, and an output layer that receives outputs from the set of hidden layers; and
wherein the training comprises iteratively performing until a defined criterion is satisfied:
selecting a tuple from the set of training data that has not been employed for the training,
providing the respective training medical image of the tuple to the input layer,
providing the respective training confidence quantile value of the tuple to the conditioning layer,
performing, via execution of the machine learning model, the regression task on the respective training medical image using the respective training confidence quantile value, and
updating the machine learning model based on loss function associated with a result of performing the regression task and the respective ground truth annotation of the tuple;
access a medical image and a user-specified confidence quantile value; and
perform, via execution of the machine learning model, the regression task on the medical image with the user-specified confidence quantile value.

16. The computer program product of claim 15, wherein a result of performing the regression task on the medical image comprises:

a lower-bound regression task result based on both the medical image and the user-specified confidence quantile value; and an upper-bound regression task result based on both the medical image and the user-specified confidence quantile value.

17. The computer program product of claim 16, wherein the program instructions are further executable to cause the processor to:

render the lower-bound regression task result and the upper-bound regression task result on a graphical user-interface.

18. The computer program product of claim 16, wherein the program instructions are further executable to cause the processor to:

render a difference between the lower-bound regression task result and the upper-bound regression task result on a graphical user-interface.

19. The computer program product of claim 15, wherein the conditioning layer is a feature-wise linear modulation layer.

20. The computer program product of claim 15, wherein the program instructions are further executable to cause the processor to:

perform, via execution of the machine learning model, the regression task on the medical image again using a different user-specified confidence indicator.

\* \* \* \* \*